United States Patent
Desai et al.

(10) Patent No.: US 10,382,896 B2
(45) Date of Patent: Aug. 13, 2019

(54) AUXILIARY CONTENT DELIVERY

(71) Applicant: Futurewei Technologies, Inc., Plano, TX (US)

(72) Inventors: Vipul Desai, Palatine, IL (US); Philippe Sartori, Plainfield, IL (US); Murali Narasimha, Vernon Hills, IL (US); Mazin Ali Al-Shalash, Frisco, TX (US); Weimin Xiao, Hoffman Estates, IL (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 181 days.

(21) Appl. No.: 15/474,127

(22) Filed: Mar. 30, 2017

(65) Prior Publication Data
US 2017/0290034 A1    Oct. 5, 2017

Related U.S. Application Data

(60) Provisional application No. 62/317,158, filed on Apr. 1, 2016.

(51) Int. Cl.
*H04W 4/029* (2018.01)
*H04W 4/02* (2018.01)
*H04W 88/04* (2009.01)

(52) U.S. Cl.
CPC ........... *H04W 4/029* (2018.02); *H04W 4/027* (2013.01); *H04W 88/04* (2013.01)

(58) Field of Classification Search
CPC ..................................................... H04W 88/04
See application file for complete search history.

(56) References Cited

U.S. PATENT DOCUMENTS

| | | | | |
|---|---|---|---|---|
| 8,223,643 B1* | 7/2012 | Wolfgang | ............ | H04L 1/0071 370/235 |
| 2010/0022184 A1* | 1/2010 | Khoshnevis | ......... | H04B 7/2606 455/7 |
| 2016/0047884 A1* | 2/2016 | Zhang | ................. | H04B 7/0617 342/458 |

* cited by examiner

*Primary Examiner* — Hong S Cho
(74) *Attorney, Agent, or Firm* — Slater Matsil, LLP

(57) ABSTRACT

System and method embodiments for auxiliary content delivery are disclosed. In an embodiment, a method in a transmission point (TP) for auxiliary content delivery includes determining a mobile wireless device capable of auxiliary content delivery to an end device according to predicted movement of the mobile wireless device with respect to the end device. The method also includes encoding content data into a plurality of content data packets such that the content data is recoverable by the end device from a subset of the plurality of content data packets. The method also includes transmitting control data and one or more of the plurality of content data packets to the mobile wireless device when the mobile wireless device is within a first proximity of the TP. The control data provides to the wireless device scheduling information for the retransmission of the content data packets to the end device.

21 Claims, 10 Drawing Sheets

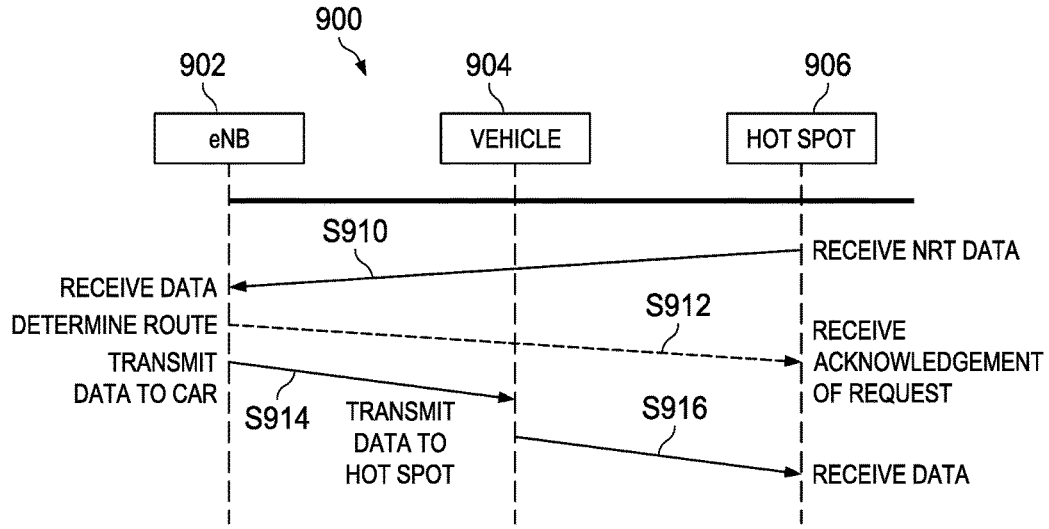
FIG. 9
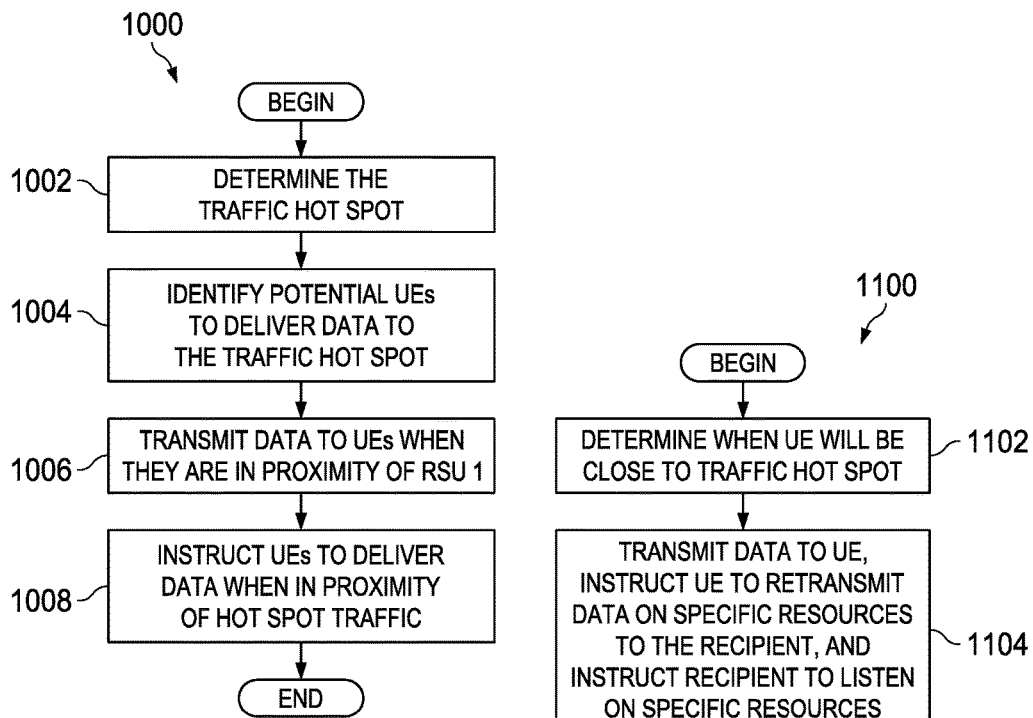
FIG. 10
FIG. 11

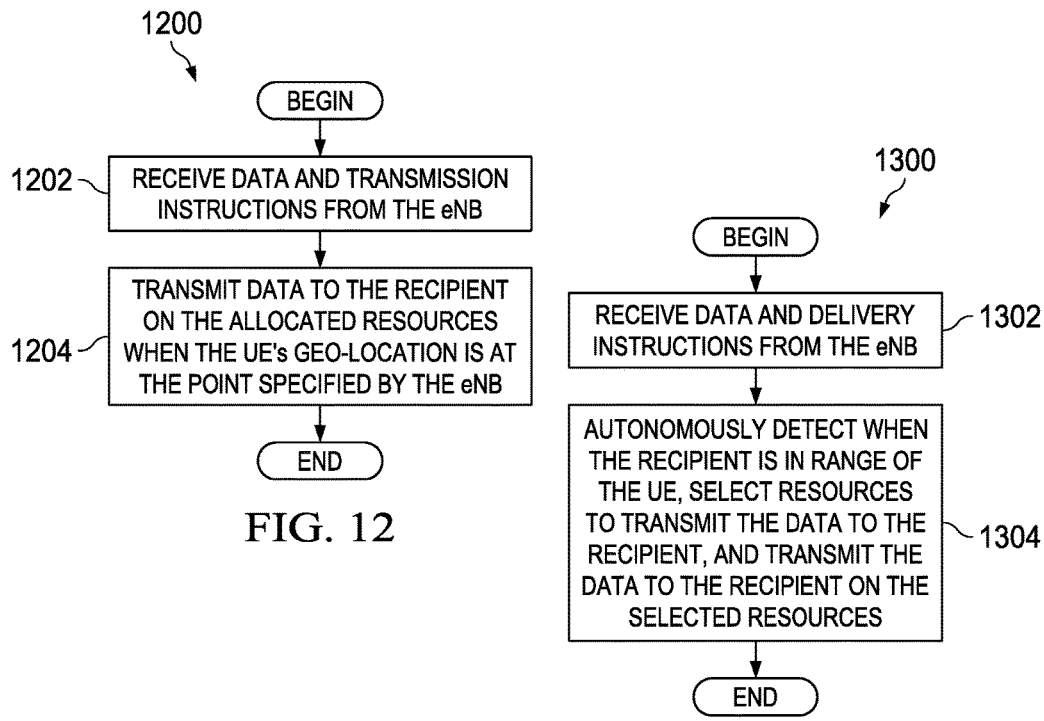
FIG. 12
FIG. 13
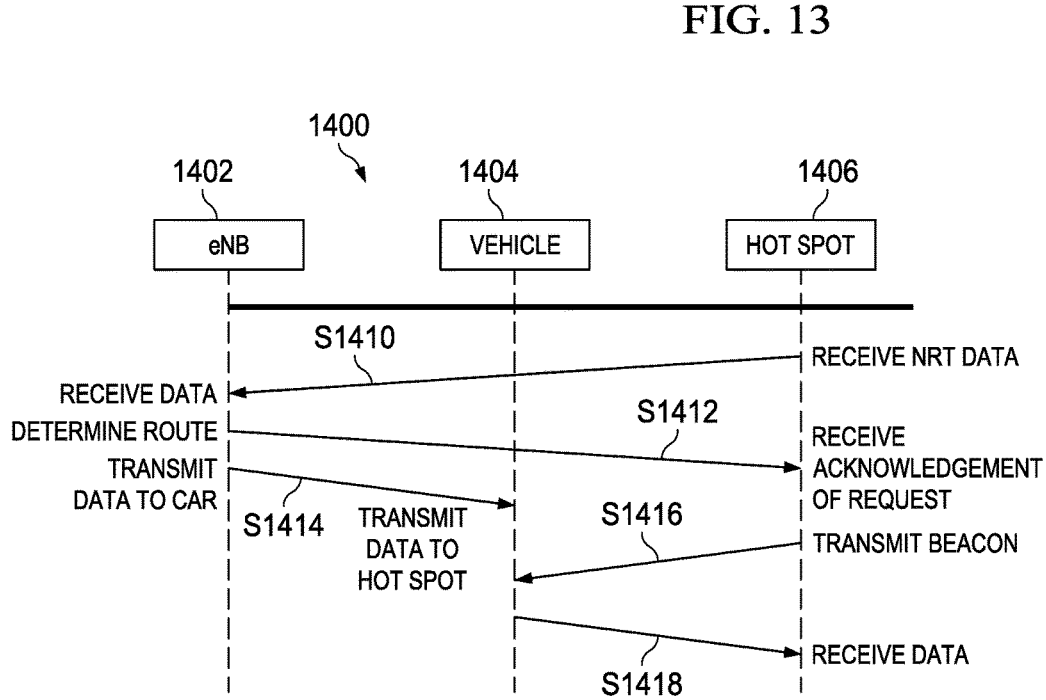
FIG. 14

AUXILIARY CONTENT DELIVERY

The present application claims the benefit of U.S. Provisional Patent Application No. 62/317,158 filed Apr. 1, 2016 and entitled "Auxiliary Content Delivery," which is incorporated herein by reference as if reproduced in its entirety.

TECHNICAL FIELD

The present disclosure relates generally to wireless communications and, in particular embodiments, to relaying data.

BACKGROUND

Increasingly, many objects, devices, and things that once operated without computer assistance now incorporate some sort of data processing system. Incorporation of data processing systems may help the object, device, or thing function better or provide greater convenience to the user. Connecting these objects, devices, and things to the internet further increases their utility. Many of these objects, devices, and things may be located in areas without wired internet access. Furthermore, many of these objects, devices, and things may also be located in areas with poor wireless service. Often, it is not economically feasible to add cell towers to these areas. Thus, in order to serve data to these poor coverage areas, fixed relays may be used to extend the coverage area of existing cell towers. However, even using fixed relays can be expensive and not economically feasible sometimes. Therefore, it is desirable to have a new method and system for serving data to objects, devices, and things in poor coverage areas.

SUMMARY

According to one aspect of the present disclosure, a method in a transmission point (TP) for auxiliary content delivery includes determining a mobile wireless device capable of auxiliary content delivery to an end device according to predicted movement of the mobile wireless device with respect to the end device. The method also includes encoding content data into a plurality of content data packets such that the content data is recoverable by the end device from a subset of the plurality of content data packets. The method also includes transmitting control data and one or more of the plurality of content data packets to the mobile wireless device when the mobile wireless device is within a first proximity of the TP. The control data provides scheduling information to the mobile wireless device for the retransmission of the one or more or the plurality of content data packets to the end device. The scheduling information includes time and frequency resources for retransmission by the mobile wireless device of the one or more of the plurality of content data packets to the end device when the mobile wireless device is within a second proximity of the end device.

According to one aspect of the present disclosure, a transmission point (TP) for auxiliary content delivery includes a non-transitory memory storage comprising instructions and one or more processors in communication with the memory. The one or more processors execute the instructions for determining a mobile wireless device capable of auxiliary content delivery to an end device according to predicted movement of the mobile wireless device with respect to the end device. The one or more processors also execute the instructions for encoding content data into a plurality of content data packets such that the content data is recoverable by the end device from a subset of the plurality of content data packets. The one or more processor also execute the instructions for transmitting control data and one or more of the plurality of content data packets to the mobile wireless device when the mobile wireless device is within a first proximity of the TP. The control data instructs the mobile wireless device when to retransmit the one or more of the plurality of content data packets to the end device. The control data also provides scheduling information to the mobile wireless device for the retransmission of the one or more or the plurality of content data packets to the end device. The scheduling information includes time and frequency resources for retransmission by the mobile wireless device of the one or more of the plurality of content data packets to the end device when the mobile wireless device is within a second proximity of the end device.

According to one aspect of the present disclosure, a non-transitory computer-readable medium storing computer instructions for auxiliary content delivery, that when executed by one or more processors, cause the one or more processors to perform several steps. The steps include determining a mobile wireless device capable of auxiliary content delivery to an end device according to predicted movement of the mobile wireless device with respect to the end device. The steps also include encoding content data into a plurality of content data packets such that the content data is recoverable by the end device from a subset of the plurality of content data packets. The steps also include transmitting control data and one or more of the plurality of content data packets to the mobile wireless device when the mobile wireless device is within a first proximity of the TP. The control data provides scheduling information to the mobile wireless device for the retransmission of the one or more or the plurality of content data packets to the end device. The scheduling information includes time and frequency resources for retransmission by the mobile wireless device of the one or more of the plurality of content data packets to the end device when the mobile wireless device is within a second proximity of the end device.

Optionally, in any of the preceding aspects, another implementation of the aspect provides that the mobile wireless device comprises a first wireless device, wherein the control data comprises first control data, and further includes determining a second mobile wireless device capable of auxiliary content delivery to an end device. Optionally, in any of the preceding aspects, a further implementation of the aspect provides for transmitting second control data and one or more of the plurality of content data packets to the second mobile wireless device when the second mobile wireless device is within a third proximity of the TP. The second control data provides second scheduling information to the second mobile wireless device for the retransmission of the one or more of the plurality of content data packets to the end device. The second scheduling information comprises time and frequency resources for retransmission by the second mobile wireless device of the one or more of the plurality of content data packets to the end device when the mobile wireless device is within a fourth proximity of the end device.

Optionally, in any of the preceding aspects, another implementation of the aspect provides that determining a mobile wireless device capable of auxiliary content delivery to an end device includes determining the mobile wireless device according to geo-location data and velocity data for the mobile wireless device. Optionally, in any of the preceding aspects, another implementation of the aspect provides that the control data is determined according to geo-location data and velocity data received from the mobile wireless device. Optionally, in any of the preceding aspects, another implementation of the aspect provides that the end device is located near an edge of a coverage area of the TP or outside the coverage area of the TP. Optionally, in any of the preceding aspects, another implementation of the aspect provides that the control data instructs the mobile wireless device to retransmit the one or more of the plurality of content data packets when the mobile wireless device detects a beacon from the end device. Optionally, in any of the preceding aspects, another implementation of the aspect provides that the control data schedules the mobile wireless device to retransmit the one or more of the plurality of content data packets at a specified time, the specific time determined according to an estimate of when the mobile wireless device will be near the end device or determined according to a proximity of the geo-location of the end point.

Optionally, in any of the preceding aspects, another implementation of the aspect, data transmission of time insensitive data is provided to end devices that are near the edge of a transmission point's coverage area and outside the range of high speed data transfer or are completely outside the transmission point's coverage area by using a third party that is mobile and travels from near the transmission point to near the end device. The various disclosed methods and systems provide improved transmission point performance by allowing the transmission point to utilize high speed communication channels to transmit the data to the third party rather than using lower speed communication channels to transmit the data to the end device. This frees the transmission point to perform other actions faster. Furthermore, in various embodiments, the transmission of the data to the end device is accomplished without feedback between the third party and the end point and sometimes, without feedback between the end point and the transmission point. Additionally, in various embodiments, dedicated links between the transmission point and the relay are not needed.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 9 is a message flow diagram illustrating an embodiment method for auxiliary content delivery;

FIG. 10 is a flowchart illustrating an embodiment method in an eNB for auxiliary content delivery;

FIG. 11 is a flowchart of an embodiment method for an eNB to instruct a mobile UE to transmit data to a recipient;

FIG. 12 is a flowchart of an embodiment method for a mobile UE to receive data from a eNB and retransmit the data to a recipient according to instructions provided by the eNB;

FIG. 13 is a flowchart of an embodiment method for a mobile UE to receive data from an eNB and retransmit the data to the recipient at a time or location autonomously determined by the UE and using resources autonomously determined by the UE;

FIG. 14 is a message flow diagram illustrating an embodiment method for auxiliary content delivery;

DETAILED DESCRIPTION OF ILLUSTRATIVE EMBODIMENTS

Figure 1:
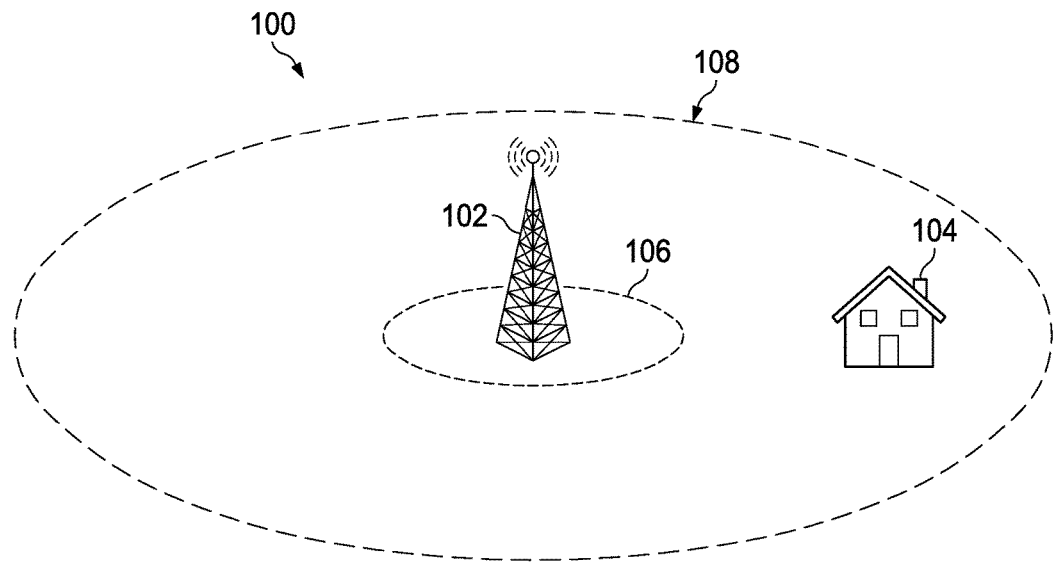
FIG. 1 is a diagram illustrating higher bit rates for devices close to an eNB and lower bit rates for devices at the edge of the cell.

The structure, manufacture and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Disclosed herein are methods, systems, devices, and computer readable instructions for auxiliary content delivery. In an embodiment, a transmission point (TP), such as an enhanced Node B (eNB), transmits data to a recipient device that is located near the edge of the TPs coverage area or outside the TPs coverage area via use of an intermediary mobile wireless device that is travelling (or predicted to be traveling) through a coverage area of the TP and on to an area in which the intermediary mobile wireless device can retransmit data received from the TP to the recipient. The intermediary mobile wireless device receives the data at a first location and then travels nearer to the recipient and then transmits the data to the recipient. In an embodiment, the intermediary mobile wireless device transmits the data to the recipient when the intermediary mobile device is sufficiently proximate to transmit to the recipient and for the recipient to receive the transmission. In an embodiment, whether the intermediary mobile wireless device is sufficiently proximate to the recipient is determined according to detection of signals such as the reception of the beacon. In other embodiments, whether the intermediary mobile wireless device is sufficiently proximate to the recipient is determined according to the geo-location of the intermediary mobile wireless device and/or the recipient. The determination of what constitutes proximity may be determined autonomously by the intermediary mobile wireless device or by the TP. In this manner, the TP can deliver data to the recipient that it could not otherwise ordinarily deliver data to due to the recipient being outside the coverage are of the TP. This also enables the TP to more quickly deliver data to a recipient that is near the edge of the TPs coverage area and subject to otherwise slow data transfer speeds due to its distance from the TP.

In various embodiments, the TP may make use of several mobile devices each traveling through the coverage area and towards an area near the recipient. In some embodiments, the content may be encoded so that if one or more data packets are lost, the recipient may nonetheless be able to recreate the all or a majority of the data from the content in other data packets even though the recipient may not be able to acknowledge receipt of the data or request that the TP resend the data.

In an embodiment, the packets include a coded version of two or more data segments. In some embodiments, no acknowledgements are provided by either the intermediary mobile wireless device or by the recipient. In other embodiments, the intermediary mobile wireless device may provide an acknowledgment to the TP and may request that the TP retransmit data. In other embodiments, the recipient may provide an acknowledgment to the intermediary mobile wireless device and may request that the intermediary mobile wireless device retransmit data. The intermediary mobile wireless device may transmit the data to the recipient using the same wireless protocols and technology with which it received the data from the TP or may use a different wireless protocol and technology. In an example embodiment, the TP may be a wireless access point (AP) within a building and the recipient be a device outside of the coverage range of the AP or so distant as to receive slow or poor transmission from the AP. In some embodiments, the intermediary mobile device may, for example, be carried by a person or may be attached to a drone. Other more typical embodiments involve automobiles (also referred to as cars) carrying the intermediate mobile wireless device.

The disclosed methods and systems provide a number of advantages over prior art methods and systems. For example, in various embodiments, data transmission of time insensitive data is provided to end devices that are near the edge of a transmission point's coverage area and outside the range of high speed data transfer or are completely outside the transmission point's coverage area by using a third party that is mobile and travels from near the transmission point to near the end device. The various disclosed methods and systems provide improved transmission point performance by allowing the transmission point to utilize high speed communication channels to transmit the data to the third party rather than using lower speed communication channels to transmit the data to the end device. This frees the transmission point to perform other actions faster. Furthermore, in various embodiments, the transmission of the data to the end device is accomplished without feedback between the third party and the end point and sometimes, without feedback between the end point and the transmission point. Additionally, in various embodiments, dedicated links between the transmission point and the relay are not needed.

To aid in understanding the methods and systems disclosed below, consider the following scenario. Suppose the person A in Chicago has a friend in Antarctica. The friend wants a packet from person A. Person A knows that person B traveling from Chicago to Antarctica. Therefore, person A asks person B whether he has space to carry the packet and when he will arrive in Antarctica. If person B has room to carry the packet, person A informs the friend of the itinerary. When person B arrives in Antarctica, the friend is able to receive the packet.

A similar system may be utilized in wireless communication systems. Suppose an end point (hot spot) has poor coverage from a base station. However, there may be many resources (e.g., mobile devices perhaps located in a vehicle such as a car or train) with low MCS and high retransmission rates. If there is a large amount of data to be transmitted between the base station and the end point, these resources may be utilized to deliver delay insensitive data to the end point. There may be a high modulation coding scheme (MCS) used from point A (i.e., the base station) to the mobile device and high MCS used from the mobile device to point B (i.e., the end point). In an embodiment, in order to enable such a system, the base station should know when the mobile device will be near the end point and when the mobile device will be near the base station. The transmit time of the mobile device may also be required in an embodiment.

The base station can determine whether the mobile device has the capacity to receive, store, and retransmit the data to the end point. If the mobile device has the capacity, then the base station encodes data and transmits the data to the mobile device with instructions as to when the mobile device is to retransmit the data. The mobile device does not need to know anything about the data other than when to retransmit. The data may be encoded and the base station may use multiple mobile devices to deliver the data to the end point. The data may be encoded in such a way that even if one of the mobile devices fails to travel to the desired end point, fails to transmit the data, or the end point otherwise fails to receive the data transmitted by the mobile device, the data received from the other mobile devices is sufficient for the end point to recreate all or most of the data transmitted by the base station. In an embodiment, the base station may indicate directly to the end point when it should expect to receive the data.

In various embodiments, network coding and multiple mobile devices are used to improve the reliability of transmission. In an embodiment, the basis is V2X transmissions that are broadcast. As used herein, V2X means vehicle to anything, where V2V means vehicle to vehicle. In an embodiment, V2V transmissions use the sidelink. Uplink is from the vehicle to the eNB and the downlink is from the eNB to the vehicle. In various embodiments, the elements for mobile device transmission (delivery to the end point from the base station) include transmit based on location, transmit based on time, and transmit based on receiving a beacon from the end point. In various embodiments, the elements for mobile device reception (from end point to base station) include receiving based on location and based on time.

In a typical cellular network, link efficiency is not uniform in a coverage area of a cell because the received power p decreases as a function of the distance d between the transmitter and receiver. In decibels, $p=K+10\alpha \log_{10} d$, where K is a constant and the pathloss exponent $\alpha$ is often greater than 2. The implication is that received signal is low at the cell edge, thereby reducing the achievable data rate at the cell edge. Generally, close to the eNB, the eNB↔UE (user equipment) link is good; allowing high-order modulation and/or high coding rates to be used. MCS can represent the combination of modulation and coding rate. A high MCS value often indicates the combination of high-order modulation and high coding rates can be used. On the other hand, when the UE is far from the eNB, a low-order modulation and/or a low coding rate (low MCS) needs to be used. As a consequence, a UE at the edge of the cell experiences a lower bit rate than when close to the eNB.

FIG. 1 is a diagram of a system 100 illustrating an example of this scenario in which higher bit rates are provided for devices close to an eNB and lower bit rates for devices at the edge of the cell. System 100 includes an eNB 102 having a coverage area 108 and a region 106 that can support high MCS (high throughput). In the depicted scenario, the house 104 is in coverage area 108 of the eNB 102, but is near the edge of the coverage area 108 of the eNB 102 (e.g. cell edge) and outside the region 106 that can support high MCS. Thus, the eNB 102 should use a low MCS to serve the house 104, which is located at cell edge.

Consider the case where the traffic demand at the edge of the cell is high (traffic hot spot). It is difficult to provide a high bit rate to the hot spot, making the demand from the traffic hot spot hard to fulfill. Consequently, there is a need for a method to deliver high data rate at locations far from the eNB.

There have been enhancements made to the cellular system, such as relays, that improve coverage (or effectively the data rate) at cell edges. Using small cells in conjunction with large area coverage macro cells allows localized high data rates. Often these enhancements may be difficult for high mobility applications due to a large number of hand-offs. Other techniques such as CoMP (cooperative multi-point) could be used, but will not provide the dramatic increase in data rate that may be needed.

Disclosed herein are methods, systems, and devices to deliver non-real-time (NRT) data to the edge of the cell using mobile devices, such as, for example, mobile devices carried in automobiles, trains, buses, or other vehicles or vehicles with integrated wireless devices or systems. In an embodiment, with connected autos, the network may know the route the vehicle will take and can determine whether the vehicle will be in proximity of the traffic hot spot. If the vehicle is in proximity, the eNB can send data intended for the traffic hot spot by first sending the data to the vehicle. The vehicle then buffers the data. When the vehicle arrives in proximity of the hot spot traffic demand, the vehicle transmits data over a direct link (e.g., sidelink—the data does not go through an eNB) to the hot spot traffic demand.

Figure 2:
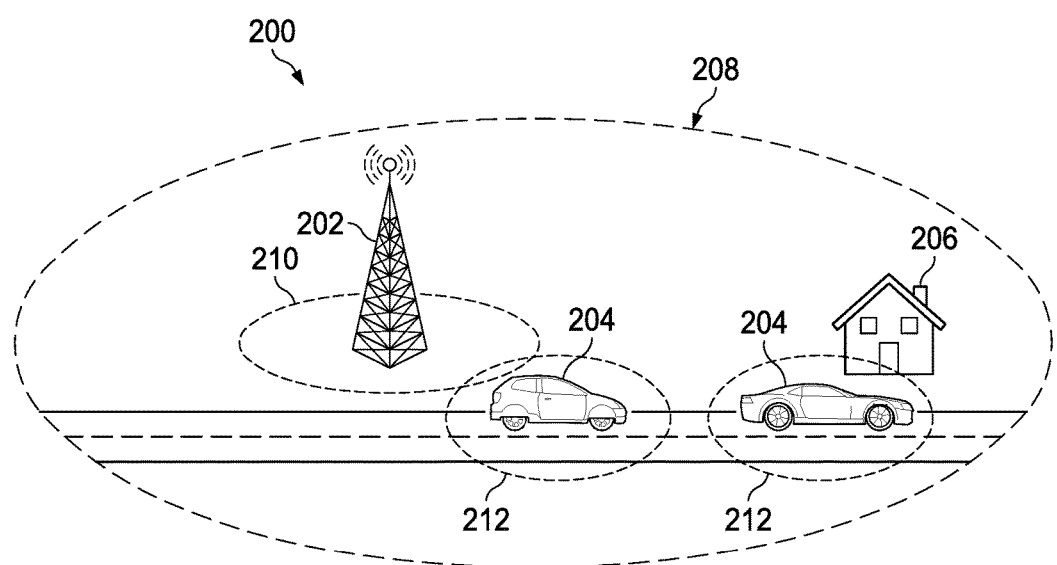
FIG. 2 is a diagram illustrating an embodiment system for auxiliary content delivery.

FIG. 2 is a diagram illustrating an embodiment system 200 for auxiliary content delivery. System 200 includes an eNB 202 having a coverage area 208 and an area 210 of high MCS. The system 200 also includes a car 204, with a wireless communication system, traveling through the area 210 of high MCS and through the coverage are 208. Additionally, the system 200 includes a house 206 with a wireless communication system. The car 204 includes a coverage area 212 around the car in which the car is capable of transmitting data reliably (for the destination) at high MCS. During the moment that the car 204 is near the eNB 202 and inside the area 210 of high MCS for the eNB 202, the eNB 202 provides data intended for the house 206 by first sending data to the car 204 using a high MCS. As the car 204 approaches the house 206, the car 204 sends the data to the house 206 using a high MCS. The data is delivered, albeit with some delay. To emphasize the non-real-time nature of this delivery, Table 1 shows that a car traveling 60 kilometers (km)/hour needs about 6 seconds to travel 100 meters (m).

TABLE 1

Time needed for a car to travel a distance at a fixed speed

| Speed, km/h | Time in seconds to travel 50 m | Time in seconds to travel 100 m |
| --- | --- | --- |
| 3 | 60 | 120 |
| 10 | 18 | 36 |
| 30 | 6 | 12 |
| 60 | 3 | 6 |
| 100 | 1.8 | 3.6 |

The same technique can be used to collect data from remote locations without suitable cellular access and upload the data to a server. For example, a remote weather station by the side of a rural highway may be recording weather data continuously but may not have reliable cellular connectivity to frequently transmit data to a server. The methods shown here can be used to provide a data stream to transfer the weather data to one or more mobile devices traveling near the weather station which then pass the data along to an access point (e.g., an eNB) which then transmits the data to a server.

Using the combination of non-real data and vehicles can extend a network topology to provide new types of data delivery services. This disclosure describes several data delivery services.

Figure 3:
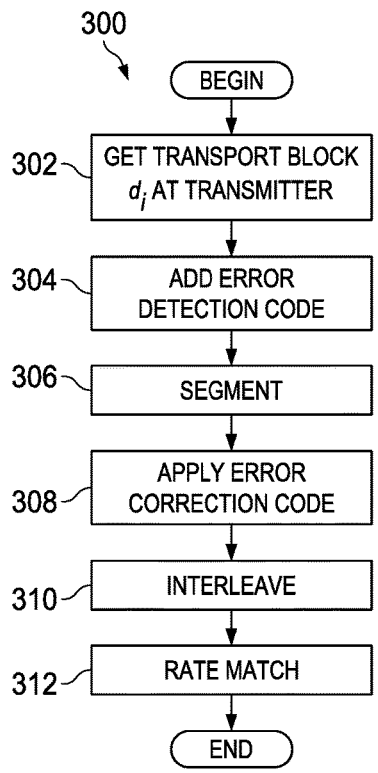
FIG. 3 is a diagram illustrating a typical coding procedure in LTE.

FIG. 3 is a diagram illustrating an embodiment of a coding procedure 300 in LTE. There are many ways to encode transport blocks (data) to ensure the transport blocks are received correctly. Suppose there is a sequence of transport blocks $d_0, d_1, d_2, \ldots$. Without loss of generality, assume the size of the transport blocks is the same (e.g., in terms of bytes). At block 302, the method 300 obtains transport block $d_i$ at the transmitter. At block 304, an error detection code (e.g., parity from a cyclic redundancy check (CRC) code) is appended to a transport blocks. At block 306, a segmentation step divides the encoded transport blocks into smaller blocks if the length of the transport block, the error detection code, and any other overhead exceeds a predetermined size. Without loss of generality, there is only one block (one segment). Next, at block 308, an error correction code (e.g., turbo code) is applied to the block. At block 310, the output of the error correction block is interleaved. At block 312, the interleaved output is rate matched to the number of bits to modulate, after which, the method 300 may end. Rate matching can involve puncturing and/or repeating. In LTE, the sequence of bits from the rate matching output is a function of the redundancy version (0, 1, 3, 2). There are four versions, labeled 0 through 3, and cycling uses all four before repeating.

The transmission process can be tailored to the scenario. Table 2 shows some processes. Some common abbreviations are: hybrid automatic repeat request (HARQ), incremental redundancy (IR), redundancy version (RV). Often, there can be 4 versions of the rate matched output. One version is transmitted. With HARQ, if the first version is not received correctly, another version can be transmitted based on the feedback. At the receiver the versions can be combined and then decoded. Typically, the packet error rate for the first version is 10 to 30%. With combining, the packet error rate can be reduced to $10^{-4}$.

TABLE 2

| | steps | Target |
|---|---|---|
| Repeat n times | Encode, one RV | No physical layer feedback, typically low MCS |
| Repeat n times | Encode, cycle through RV | No physical layer feedback, typically low MCS |
| Repeat based on feedback | Encode, one RV | physical layer feedback, typically high MCS |
| Repeat based on feedback | Encode, cycle through RV | physical layer feedback, typically high MCS |

Broadcast scenarios are typically based on repeating n times (either one RV or multiple RVs) and assume low MCS for the worst case scenario. As a result, the throughput is generally low. With scenarios operating with physical layer feedback, the throughput is generally higher despite using a higher MCS and the fewer number of retransmissions.

It is desirable to obtain high throughputs for broadcast scenarios. The solution uses packet coding of k packets and n repetitions to obtain high throughputs for NRT applications (broadcasts). There are many types of packet coding schemes (network codes, raptor codes, fountain codes). The description is shown for network codes. The operator $\oplus$ is applicable to bits as well as packets. An example of the operator $\oplus$ is the exclusive-or operation.

TABLE 3

| Properties | |
|---|---|
| Description | Operation |
| Additive inverse | $x \oplus x = 0$ |
| Additive identity | $x \oplus 0 = x \oplus x = x$ |
| Commutative | $x \oplus y = y \oplus x$ |
| Associative | $(x \oplus y) \oplus z = x \oplus (y \oplus z)$ |

For example with $k=3$ packets $p_0$, $p_1$, $p_2$, one possible network coding scheme to produce transport block $d_i$ is $$\begin{bmatrix} d_0 \\ d_1 \\ d_2 \end{bmatrix} = \begin{bmatrix} 1 & 0 & 1 \\ 0 & 1 & 1 \\ 1 & 1 & 1 \end{bmatrix} \begin{bmatrix} p_0 \\ p_1 \\ p_2 \end{bmatrix}$$

where $d_0 = p_0 \oplus p_2$.

At the receiver, the estimated packets $\hat{p}_i$ can be recovered from the decoded transport block $\hat{d}_i$ using $$\begin{bmatrix} \hat{p}_0 \\ \hat{p}_1 \\ \hat{p}_2 \end{bmatrix} = \begin{bmatrix} 0 & 1 & 1 \\ 1 & 0 & 1 \\ 1 & 1 & 1 \end{bmatrix} \begin{bmatrix} \hat{d}_0 \\ \hat{d}_1 \\ \hat{d}_2 \end{bmatrix}.$$

In this example, $$\hat{p}_0 = \hat{d}_1 \oplus \hat{d}_2$$
$$= (p_1 \oplus p_2) \oplus (p_0 \oplus p_1 \oplus p_2)$$
$$= p_0$$

The examples above show the generation and decoding of binary network coding packets (i.e., using a Galois field (GF) of size 2). As a more general framework, packets (transport blocks) $d_0, d_1, \ldots, d_n$ can be generated as follows:

$$\begin{bmatrix} d_0 \\ d_1 \\ \vdots \\ d_n \end{bmatrix} = \begin{bmatrix} \alpha_{1,1} & \alpha_{1,2} & \alpha_{1,3} \\ \alpha_{2,1} & \alpha_{2,2} & \alpha_{2,3} \\ & \vdots & \\ \alpha_{n,1} & \alpha_{n,2} & \alpha_{n,3} \end{bmatrix} \begin{bmatrix} p_0 \\ p_1 \\ p_2 \end{bmatrix}$$

where $\alpha_{i,j} \in GF(K)$ are the coefficients used to generate $d_0$, $d_1, \ldots, d_n$. Note that $d_0, d_1, \ldots, d_n \in GF(K)$ and $p_0, p_1, p_2 \in GF(K)$. This enables the generation of a stream of network coded packets $d_0, d_1, \ldots, d_n$ (i.e., more than the original 3 packets). Even if some of the packets $d_0$, $d_1, \ldots, d_n$ are not received at the target node, the original packets can be recovered as follows. For example, if only packets $d_0$, $d_i$, $d_n$ are received, $p_0$, $p_1$, $p_2$ are recovered as follows:

$$\begin{bmatrix} \hat{p}_0 \\ \hat{p}_1 \\ \hat{p}_2 \end{bmatrix} = A \begin{bmatrix} \hat{d}_0 \\ \hat{d}_i \\ \hat{d}_n \end{bmatrix}, \text{where}$$

$$A = \text{inverse}\left(\begin{bmatrix} \alpha_{1,1} & \alpha_{1,2} & \alpha_{1,3} \\ \alpha_{i,1} & \alpha_{i,2} & \alpha_{i,3} \\ \alpha_{n,1} & \alpha_{n,2} & \alpha_{n,3} \end{bmatrix}\right).$$

In order to ensure that the coefficients used for generate each $d_i$ are linearly independent of the coefficients generated for prior packets (and to ensure that an invertible matrix of coefficients is available at the receiving node), K should be large (i.e., a large Galois field size makes it easy to have an invertible decoding matrix).

Vehicles can be used to deliver a steady stream of data to a road side device (e.g., a billboard). Such data will be delivered with a significant delay; therefore it may not support real time services. However, for many applications it may be adequate (for example, updating of signs/pictures on a billboard; or to provide a radio or video stream to a remote home on the side of the street).

Figure 4:
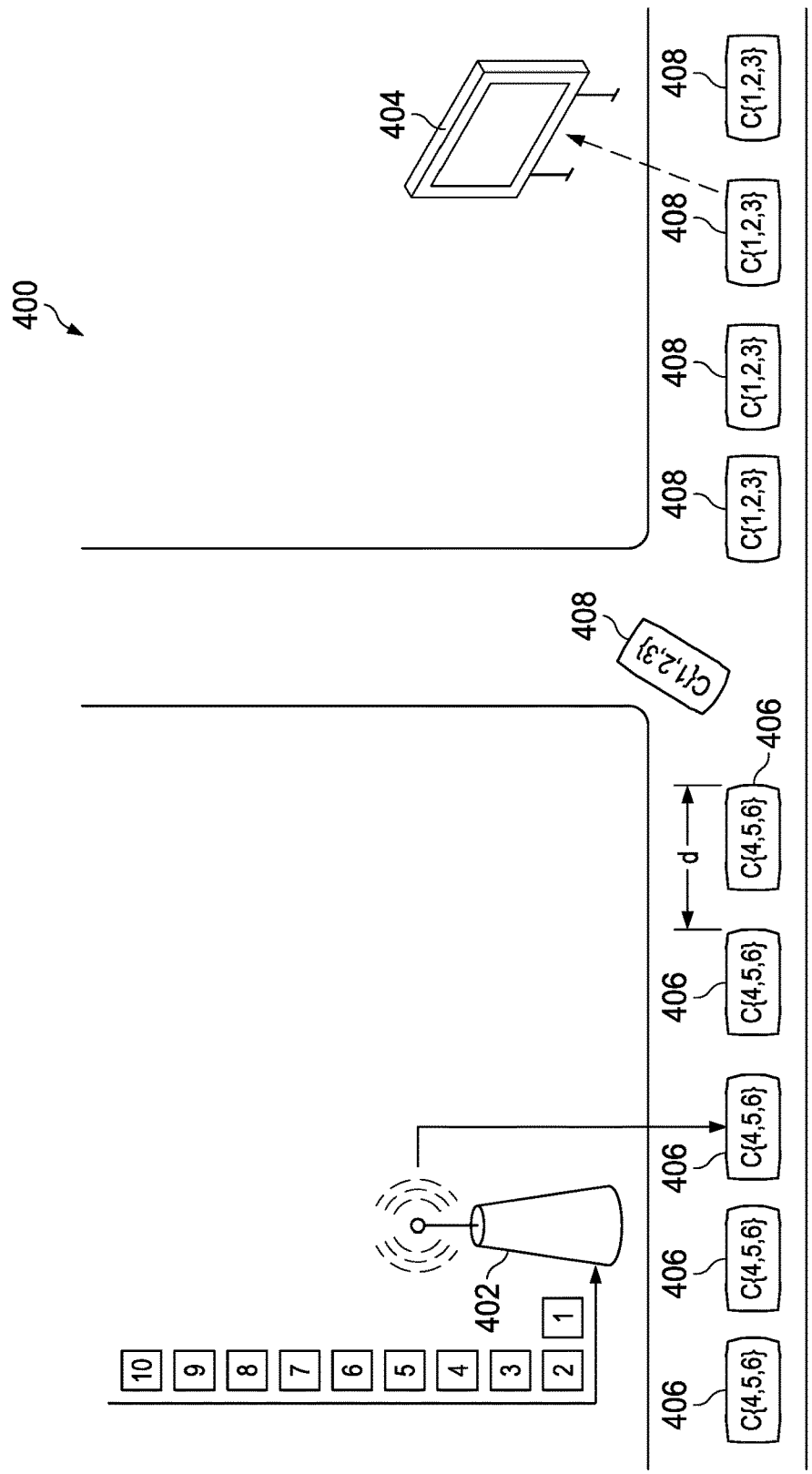
FIG. 4 is a diagram illustrating an embodiment delivery system where packets are to be sent from an access point to a device using a sequence of vehicles.

FIG. 4 illustrates an embodiment delivery system 400 where packets 1, 2, 3, etc. are to be sent from an access point to an end point device (e.g., billboard) using a sequence of vehicles (e.g., cars). System 400 includes an access point (AP) 402, a set of cars 406, 408, and an end point device 404. The AP can be any type of transmission point, including a base station (BS), a base transceiver station (BTS), enhanced Node B (eNB), etc. In an embodiment, the AP is an eNB or a gNodeB (gNB) (gNB is the proposed name of the base station in 5G). One set of cars 408 is given a network coded combination of packets {1, 2, 3}, another set of cars 406 is provided a network coded combination of packets {4, 5, 6}.

The general idea is to deliver packets from a road side AP 402 (i.e., road side unit (RSU)) to vehicles 406, 408 traveling in the direction of the end point device 404 of interest. The vehicle 406, 408 then transmits the packets to the end point device 404 when it approaches the end point device 404. In an embodiment, short range communication (e.g., millimeter wave based) is used to transmit data from the vehicle 406, 408 to the end point device 404. One challenge here is that there is no means of obtaining reliable feedback about unsuccessful packet reception at the device.

Figure 5:
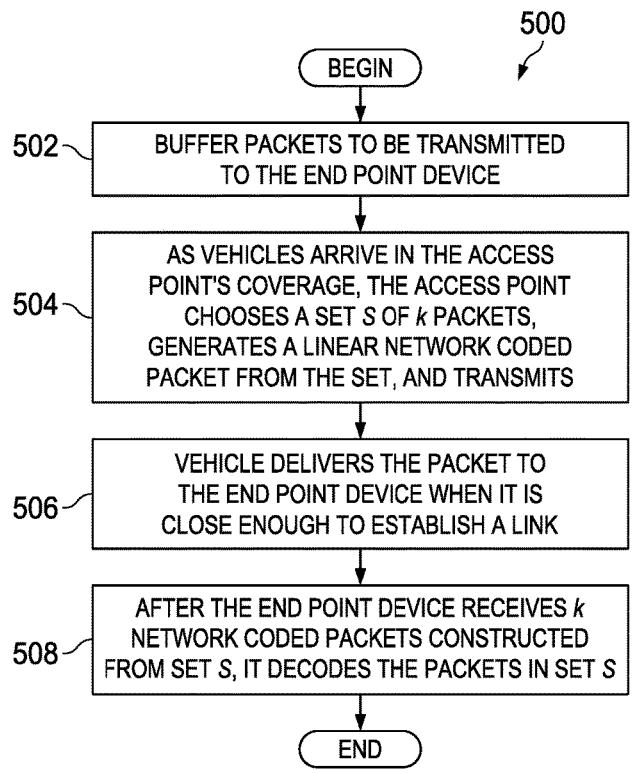
FIG. 5 is a flowchart illustrating an embodiment method for an embodiment system for auxiliary content delivery at an eNB.

FIG. 5 is a flowchart of an embodiment method 500 for network coding to overcome the problem of obtaining reliable feedback about unsuccessful packet reception at an end point device and ensure complete or almost complete delivery of the data from the AP to the end point device. With the disclosed network coding, receiving a subset of network encoded packets is sufficient for the end point to recover the data. The method 500 begins at block 502 where the access point 402 buffers packets to be transmitted to the end point device 404. At block 504, as vehicles 406, 408 arrive in the access point's coverage area (typically when high MCS can be used), the access point 402 chooses a set S of k packets, generates a linear network coded packet from the set, and transmits it to the vehicle 406, 408. The access point generates n linear network coded packets for the set S and transmits it each to a different vehicle 406, 408. The number of coded packets n is determined based on a parameter γ as described below. At block 506, the vehicle 406, 408 delivers the packet to the end point device 404 when it is close enough to establish a link. In one embodiment, a device-to-device (D2D) protocol is used to transmit the packet. In LTE, the V2V protocol is based on the D2D protocol. At block 508, after the end point device 404 receives k network coded packets constructed from set S, it decodes the packets in set S, after which, the method 500 may end.

Let γ represent the average probability that a vehicle will successfully deliver to the device the packet that it is carrying. γ takes in to account the probability of transmission failure, but also the probability that a vehicle changes direction and does not actually approach the device. If n network coded packets are transmitted by the access point, the goal is to ensure that at least $$\binom{n}{k}$$

packets are successfully delivered to the device. The probability of at least $$\binom{n}{k}$$

packets being successfully delivered to the device is $$P(n, k) = 1 - \sum_{i=0}^{k-1} \binom{n}{i} \gamma^i (1-\gamma)^{(n-i)}$$

The number of transmissions n for a given k and γ is chosen such that 1−P(n, k) is sufficiently small.

As an example, for γ=0.9, if k=3, and the desired probability of success of decoding of a set S is at least 0.99, then n is 5 (that is, 5 transmissions are needed at the access point for set size of 3). The corresponding values of n for k=4 and k=8 are 7 and 12, respectively.

Figure 6:
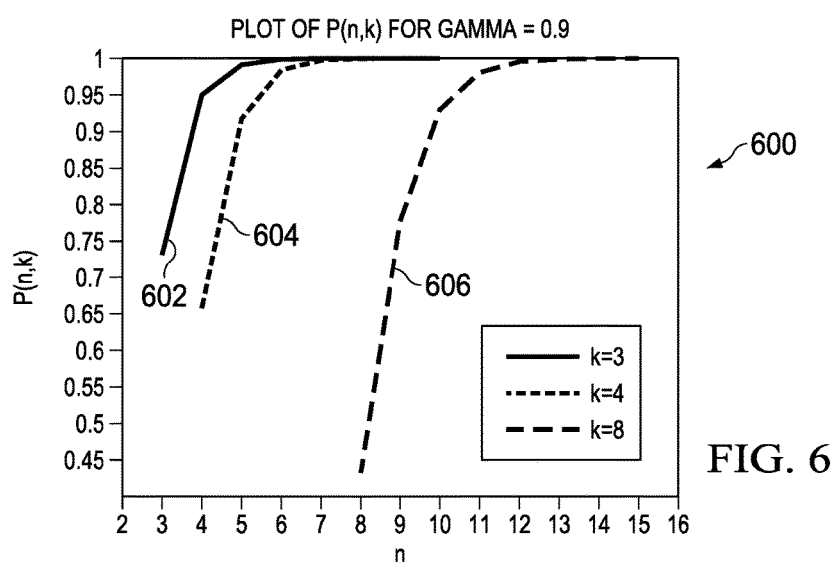
FIG. 6 is a graph illustrating probability curves for success.

FIG. 6 is a graph illustrating probability curves 600 for success. Curve 602 represents the P(n,k) for k=3, curve 604 represents the P(n,k) for k=4, and curve 606 represents P(n,k) for k=8. Thus, for a larger number of packet, k, to deliver, a larger number of transmissions, n, is needed to ensure a high probability that all the packets are delivered.

The analysis can consider the vehicle speed to determine a throughput rate. Suppose the average speed of the vehicles is s, and the average vehicle spacing (distance between two successive vehicles) is d. In an embodiment, the device has to receive k packets to decode the packets and n packets are transmitted as discussed above. Given that s/d vehicles pass the access point per second, the time to transmit n packets (to n vehicles from the access point) is nd/s seconds. The transmission data rate at the access point is $$\frac{Ls}{d}$$

bits/sec, where L is the length of a packet.

This yields a perceived throughput at the device of $$Lk \Big/ \left(\frac{nd}{s}\right) = \frac{Lks}{nd}$$

bits/sec. In other words, the efficiency of the data transmissions is k/n (or alternatively, the overhead is 1−k/n.).

To illustrate, consider the following example. s=60 mph, d=10 m, γ=0.9, L=$10^6$ bits, and the target P(n, k) is 0.99. The transmission data rate for this case is 2.67 Mbps.

When the network knows if a vehicle will pass the point, the number n can be reduced.

Another embodiment is that the networks can adjust the network coding length based on the speed of the vehicles, the inter-vehicle distance and γ to achieve a desired throughput.

Figure 7:
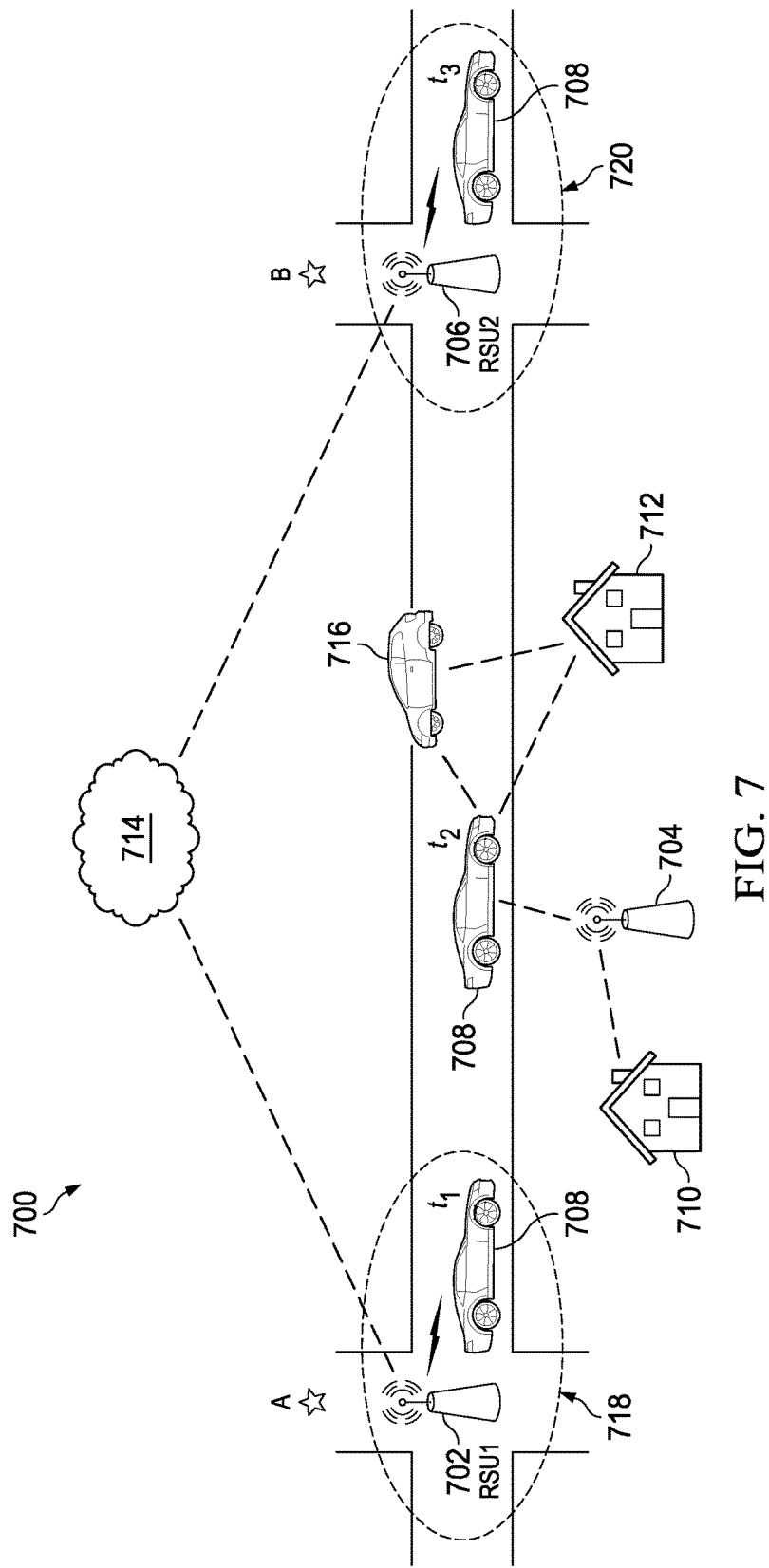
FIG. 7 is a diagram illustrating an embodiment system for auxiliary content delivery.

FIG. 7 is a diagram illustrating an embodiment system 700 for auxiliary content delivery. System 700 includes an RSU 702, an RSU 706, an RSU3 704, a network 714, a wirelessly connected vehicle 708, a wirelessly connected vehicle 716, and a plurality of wirelessly connected houses 710, 712. The RSU1 702 has an associated coverage area 718 of high MCS. RSU2 706 has an associated coverage area 720 of high MCS. In this example, location (positioning), destination, and higher throughput links are utilized to improve coverage and/or throughputs. The vehicle 708 informs the network 714 that it intends to travel to point B from its initial position point A as shown in FIG. 7. Note if a vehicle is unable to change its path (consider a highway), the vehicle may not need to inform the network about its path. The vehicle 708 crosses the intersection where coverage is provided by RSU1 702 (at time $t_1$). Based on the location of the vehicle 708 (at RSU1 702) and time $t_1$, the network 714 can anticipate when the vehicle 708 will enter the intersection where RSU3 704 is placed (e.g., based on speed limit, traffic conditions, and/or historical records). The network 714 predicts the location of the vehicle 708 at $t_2$. In an embodiment, the network provides scheduling information so that the vehicle 708 can transmit the data received from RSU1 702 to RSU3 704 which can then transmit it to house 710.

Likewise, the network 714 can predict the location of a vehicle 716 traveling in the opposite direction at time $t_2$. The vehicle 716 can receive data from RSU2 706 at time t3 (which is earlier than t2) and then retransmit the data directly to house 712 at time t2.

An RSU 702, 704, 706 can be a mini-base station or a regular base station. An RSU 702, 704, 706 can also located on top of a traffic light at an intersection or on street lights.

Assume that the environment where the houses 710, 712 are located on FIG. 7 is a traffic hot spot. For instance, someone could be watching a high resolution video. If this hot spot is within range of an eNB (not shown on the figure), but the radio conditions with this eNB are generally weak, the traffic hot spot may not be served appropriately. Alternatively, the traffic hot spot may be served appropriately, but at the expense of large resource consumption from the eNB. In such a case, other UEs (not shown on the figure) may not be served appropriately.

Figure 8:
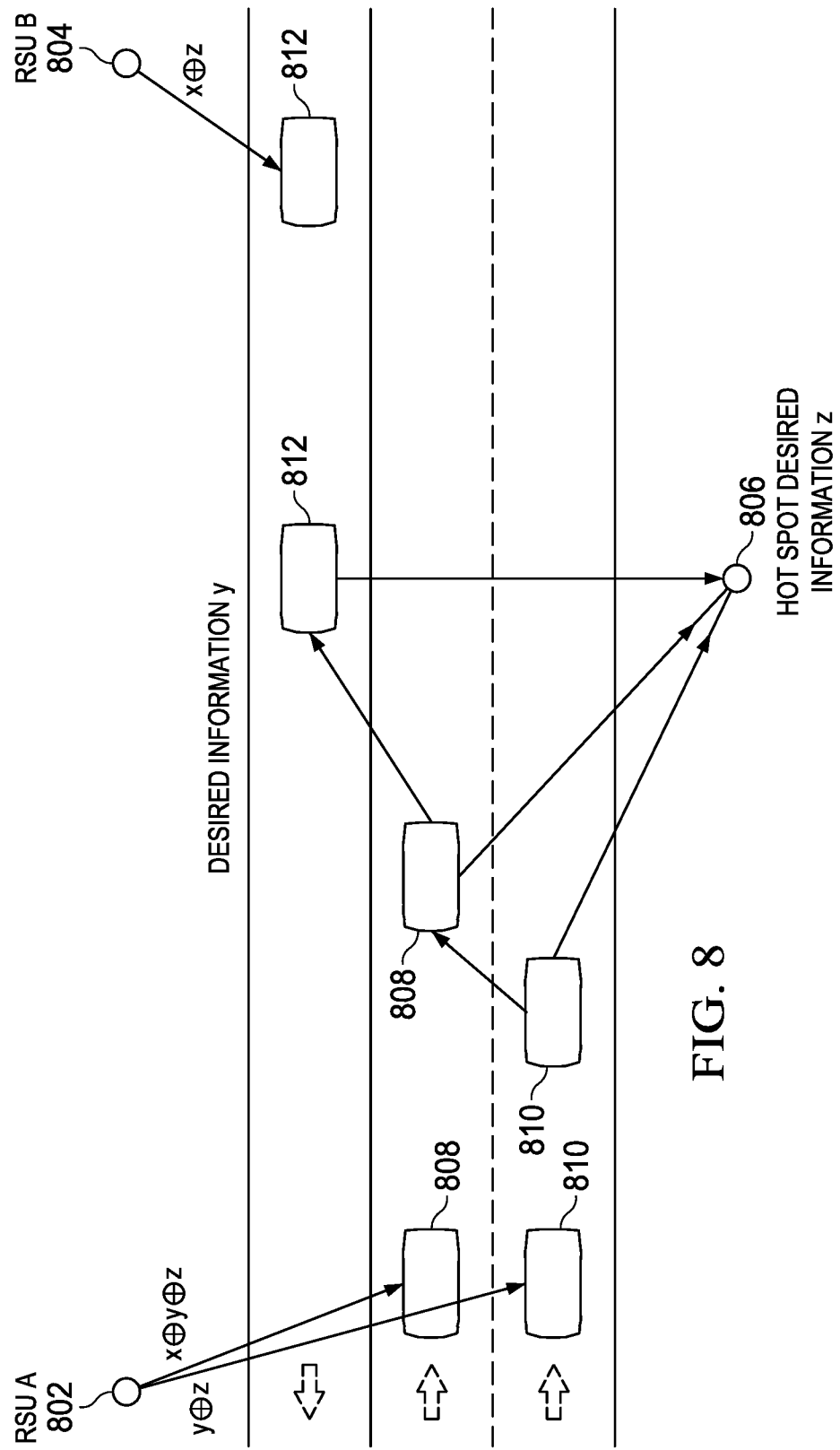
FIG. 8 is a diagram illustrating another embodiment system for auxiliary content delivery.

FIG. 8 is a diagram illustrating another embodiment system 800 for auxiliary content delivery. System 800 includes RSU A 802, RSU B 804, a plurality of wirelessly enabled cars 808, 810, 812, and a hot spot 806. The wirelessly enabled cars can be any other type of vehicle and can include a UE that is located within the vehicle. FIG. 8 shows an example where a first car 808 can be served first by RSU A 802 and then have additional information delivered somewhere between RSU A 802 and RSU B 804 from either RSU A 802 or RSU B 804. Another car 810 can be served by one or both RSU A 802 and RSU B 804 to delivery content to the hot spot 806. The hot spot 806 also can have data delivered from two or three cars 808, 810, 812. The example shows how multiple access points can work in conjunction to deliver data and how cars can get data when their trajectory is known. The cars 808, 810, 812 can also transmit data to another car 808, 810, 812 which then can retransmit the data to the hot sport 806.

Data buffering. The network approximately knows where car 810 and car 808 will be at time $t_2$ and at time $t_1$ (in relation to RSU A 802) based on the speed of both vehicles, their destinations, and possibly road conditions. Likewise, the network approximately knows where car 812 will be at time $t_2$ and at time $t_1$ (in relation to RSU B 804). The cars 808, 810, 812 may decode and store the packets until the broadcast stage.

time $t_1$, RSU A 802 sends packet (y⊕z) to car 810
time $t_1+\delta_2$, RSU A 802 sends packet (x⊕y⊕z) to car 808
time $t_1+\delta_3$, RSU B 804 send packet (x⊕z) to car 812

Broadcast. The network can provide resources when a car 808, 810, 812 can transmit. For example, the network can send a downlink control information (DCI) indicating when a UE should transmit as well as a transmission resources. In this instance, the cars 808, 810, 812 send what was stored.

time $t_2$, car 810 broadcasts packet (y⊕z)
time $t_2+\delta_4$, car 808 broadcasts packet (x⊕y⊕z)
time $t_2+\delta_5$, car 812 broadcasts packet (x⊕z)

Reception. The times the car/reception points are not transmitting, they can receive. The network should ensure that transmit/receive opportunities do not collide at a particular entity.

time $t_2$, car 808, car 812, hot spot 806 receives packet (y⊕z)
time $t_2+\delta_4$, hot spot 806 receives packet (x⊕y⊕z)
time $t_2+\delta_5$, hot spot 806 receives packet (x⊕z)

Decode. After the last packet is received (after time $t_2$), the entities process the received packets and recover the packets At the hot spot 806 reception point, the hot spot 806 combines received packet (y⊕z), received packet (x⊕y⊕z) and received packet (x⊕z) to get z.
At car 812, combine received packet (x⊕y⊕z) with stored (x⊕z) to get y.
At car 808, combine received packet (y⊕z) with stored (x⊕y⊕z) to get x.

FIG. 9 is a message flow diagram illustrating an embodiment method 900 for auxiliary content delivery. The hot spot 906 requests data S910 through the eNB 902 (the hot spot 906 is served by the eNB 902). The request S910 can indicate the data type, including quality of service, real-time data, amount of data, files). The eNB 902 sends an acknowledgment of the request S912 to the hot spot 906. The eNB 902 receives the data and determines the route to transmit the data. The eNB 902 transmits S914 the data to the vehicle 904. The vehicle 904 transmits S916 the data to the hot spot 906 when the vehicle 904 is near the hot spot 906.

FIG. 10 is a flowchart illustrating an embodiment method 1000 in an eNB for auxiliary content delivery. The method 1000 begins at block 1002 where, based on the request, the network determines that there is a high traffic demand at a given point, and that this high traffic demand is likely to persist for a relatively long time. For instance, the network may determine that a user is watching a video, and that given the total time of the video, this particular user is likely to watch this video for several minutes.

At block 1004, the network determines how to deliver the data and identifies potential UEs to deliver data to the traffic hot spot if appropriate. In an embodiment, the eNB determines a mobile wireless device capable of auxiliary content delivery to an end device according to predicted movement of the mobile wireless device with respect to the end device. The predicted movement may be determined, for example, according to past movement of the mobile wireless device, the road the mobile wireless device is traveling on, express notification from the mobile wireless device of the intended destination of the mobile wireless device (or from another device with knowledge of the mobile wireless device's destination or likely destination), scheduling information (e.g., a mobile device that is part of or integrated with a mass transit or other transit system with regular schedules), etc. The eNB receives data from the network and can determine how to deliver the data based on the data type. If the type of data is non-real time, and if the hot spot based has poor coverage, the eNB.

could transmit the data directly. However, the cost can be a large number of resources (for example physical resource blocks), high power, long periods of activity (it may take 2-3 times the amount to send the message in comparison to good coverage where high MCS can be used).

could determine which entity/entities will carry the data to the hot spot. There are several possibilities:
autonomous cars: for such cars, the network is likely to know the route these cars will take. It can then determine which one(s) will be in proximity of the traffic hot spot
regular cars: the network may predict if a car will likely be in proximity of the traffic hot spots (e.g., based on pattern learning, information from navigation software
UEs on board of a train, subway, bus, car, bicycle, boat, hover vehicle, helicopter, carried by a person, or on board any other type of vehicle (including both motorized and non-motorized vehicles). If, for example, a vehicle is a regularly scheduled commuter vehicle, the network may predict if the vehicle will likely be in proximity of the traffic hot spots based on the schedule, traffic information, and/or other information, such as other information relevant to the scheduled service After determining how to deliver the data, the eNB may acknowledge the receiving the request for data from the hot spot by sending a message to the hot spot. That message can indicate a time when to receive the data, how the data is delivered (attributes as the group, IDs, resources), coding scheme used.

With network coding, an indication of the coding parameters used (k, n) can be sent. For example, there may be a set of coding parameters such as the matrices illustrated in Table 4 below). There can be a set of tables indexed by k and n. There are k columns and n row, where k indicates the number of packets and n is the number of coded transport blocks.

TABLE 4

| k | Coding matrix (n = k) | Coding matrix n = k + 1 |
|---|---|---|
| 1 | [1](no network coding applied) | $\begin{bmatrix} 1 \\ 1 \end{bmatrix}$ |
| 2 | $\begin{bmatrix} \alpha_{1,1} & \alpha_{1,2} \\ \alpha_{2,1} & \alpha_{2,2} \end{bmatrix}$ | $\begin{bmatrix} \alpha_{1,1} & \alpha_{1,2} \\ \alpha_{2,1} & \alpha_{2,2} \\ \alpha_{3,1} & \alpha_{3,2} \end{bmatrix}$ |
| 3 | $\begin{bmatrix} \alpha_{1,1} & \alpha_{1,2} & \alpha_{1,3} \\ \alpha_{2,1} & \alpha_{2,2} & \alpha_{2,3} \\ \alpha_{3,1} & \alpha_{3,2} & \alpha_{3,3} \end{bmatrix}$ | $\begin{bmatrix} \alpha_{1,1} & \alpha_{1,2} & \alpha_{1,3} \\ \alpha_{2,1} & \alpha_{2,2} & \alpha_{2,3} \\ \alpha_{3,1} & \alpha_{3,2} & \alpha_{3,3} \\ \alpha_{4,1} & \alpha_{4,2} & \alpha_{4,3} \end{bmatrix}$ |

There may be a specific group id used to identify transport blocks to be delivered to the hot spot.

The hot spot can be told when to expect to receive transport blocks. If the sidelink is used, the hot spot can be informed when to look for scheduling assignments (SAs) in scheduling assignment pools.

The hot spot can be told the duration of transmission

At block 1006, after the network has identified which UE(s) to use, it delivers content to those UEs. In an embodiment, the eNB transmits control data and one or more of a plurality of content data packets to the mobile wireless device when the mobile wireless device is within a first proximity of the TP (e.g., in a coverage are of the eNB). The control data provides scheduling information to the mobile wireless device for the retransmission of the one or more or the plurality of content data packets to the end device. In an embodiment, the scheduling information includes time and frequency resources for retransmission by the mobile wireless device of the one or more of the plurality of content data packets to the end device when the mobile wireless device is within a second proximity of the end device (e.g., within range such that the content data packets may be successfully transmitted to the end device). The eNB may also provide parameters (e.g. control data, scheduling information) for the transmission of encoded data packets from the UE to the hot spot, such as when to transmit, what resources to transmit on, elements for scrambling, IDs. The encoded data packets may be encrypted so that the vehicle cannot process its content. In an embodiment, the encoded data packets are encoded into a plurality of encoded content data packets such that the content data is recoverable by the end device from a subset of the plurality of encoded content data packets The eNB may use a high MCS to deliver the encoded data packets to the UEs. It is possible for k=2 packets, n=3 transport blocks, a direct transmission of k packets may require (k packets×3 transmissions (HARQ)×3 times the resources needed for high MCS vs. (n transport blocks×1 transmission (HARQ)). The savings at the eNB will be significant.

At block 1008, the eNB instructs the UEs to deliver the encoded data packets when in proximity of the hot spot traffic. The UE then needs to deliver encoded data packets to the hot spot. This is done using a direct link: the data transit from the UE to the hot spot without going through an eNB.

Note however that some control information may transit through the eNB. In an embodiment, there are two possible ways to deliver the data:

As instructed by the eNB: in such a case, the eNB is in control. The eNB determines when the UE is close to the traffic hot spot (e.g., the UE can report its geo-location information to the network). When in proximity, the eNB instructs the UE to transmit data on specific resources, and instruct the recipient to listen on specific resources. The UE then transmits data to the recipient on the allocated resources.

Autonomously: the UE detects when the recipient is within range (e.g., using a D2D discovery protocol). The UE then autonomously selects resources to transmit with the recipient (or obtains resources from the eNB). Examples of detection including monitoring transmissions from the traffic hot spot.

In an example of a case in which the eNB is in control, the eNB sends a DCI to the vehicle indicating when the vehicle should transmit data on the sidelink. Typically, control information, such as DCI, can be received reliably throughout the cell. Upon reception of the DCI by the vehicle, the vehicle broadcasts the data. In this example, a DCI format that indicates that a UE should transmit the received packet (from the eNB) may be needed. In this example, the hotspot is within the coverage area of the eNB.

FIG. 11 is a flowchart of an embodiment method 1100 for an eNB to instruct a mobile UE to transmit data to a recipient. The method 1100 begins at block 1102 where the eNB determines when the UE will be close to a traffic hot spot (or other destination location with poor reception). At block 1104, the eNB transmits the data to the UE, instructs the UE to retransmit the data on specific resources to the recipient, and instructs the recipient to listen on specific resources, after which, the method 1100 may end.

FIG. 12 is a flowchart of an embodiment method 1200 for a mobile UE to receive data from a eNB and retransmit the data to a recipient according to instructions provided by the eNB. The method 1200 begins at block 1202 where the UE receives data and transmission instructions from the eNB. At block 1204, the UE transmits the data to the recipient on the allocated resources when the UE's geo-location is at the point specified by the eNB, after which, the method 1200 may end.

FIG. 13 is a flowchart of an embodiment method 1300 for a mobile UE to receive data from an eNB and retransmit the data to the recipient at a time or location autonomously determined by the UE and using resources autonomously determined by the UE. The method 1300 begins at block 1302 where the UE receives data and delivery instructions from the eNB. At block 1304, the UE autonomously detects when the recipient is in range of the UE, selects resources to transmit the data to the recipient, and transmits the data to the recipient on the selected resources, after which, the method 1300 may end. The UE may transmit according to a time value in block 1304, for example, 5 seconds after receiving data in block 1302.

FIG. 14 is a message flow diagram illustrating an embodiment method 1400 for auxiliary content delivery. FIG. 14 shows a variation of the operations in FIG. 9. The hot spot 1406 transmits a request for NRT data S1410 to the eNB 1402. The eNB 1402 receives the request and transmits an acknowledgement of the request S1412. The eNB 1402 receives the data and determines a route to transmit the data to the hot spot 1406. The eNB then transmits that data S1414 to the vehicle 1404. The vehicle 1404 travels toward the hot spot 1406 and receives a transmit beacon S1416 from the hot spot 1406. The vehicle 1404 then transmits the data S1418 to the hot spot 1406. Thus, in this variation, the hot spot 1406 begins transmitting a beacon scheduling assignment after receiving an acknowledgement. A vehicle 1404 receives this beacon and then begins transmitting the data to the hot spot 1406. In this way, the vehicles (e.g., UEs) are responsive to a signal. In an embodiment, the beacon can be in a sidelink control information (SCI) format with fields such as a group id associated with the packet. A vehicle 1404, upon receiving the SCI format, would transmit the data.

Figure 15:
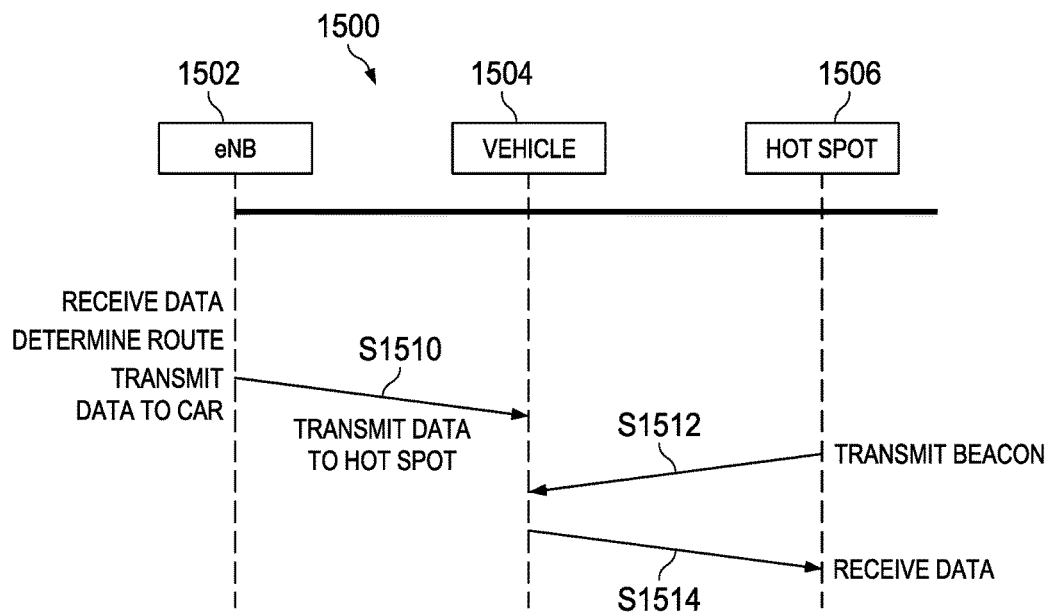
FIG. 15 is a message flow diagram illustrating an embodiment method for auxiliary content delivery.

FIG. 15 is a message flow diagram illustrating an embodiment method 1500 for auxiliary content delivery. Method 1500 is another variation of the method 900 shown in FIG. 9. The eNB 1502 receives data and determines a route to transmit the data to the hot spot 1506. The eNB 1502 then transmits the data S1510 to the vehicle 1504 determined to be able to retransmit the data to the hot spot 1506. The hot spot 1506 transmits a beacon S1512 and the vehicle 1504 transmits the data S1514 to the hot spot 1506 when it detects the beacon. In this example the hot spot 1506 may not be in communications with the eNB 1502. There can be a mode of operation, based on time of day, where the network receives data intended for the hot spot 1506. The data can be software updates. Based on configuration established between the hot spot 1506 and eNB 1502, the eNB 1502 then sends the data (possibly using network coding) to the hot spot 1502 using cars. The hot spot 1506 may also transmit beacons based on time of day.

Figure 16:
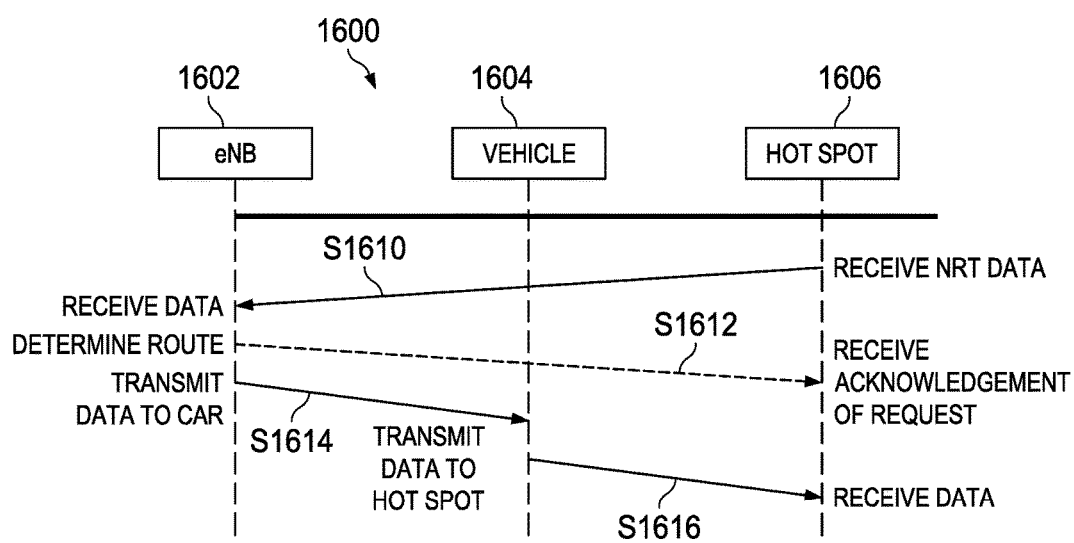
FIG. 16 is a message flow diagram illustrating an embodiment method for auxiliary content delivery.

FIG. 16 is a message flow diagram illustrating an embodiment method 1600 for auxiliary content delivery. Method 1600 is another variation of the method 900 shown in FIG. 9. The hot spot 1606 transmits a request for NRT data S1610 to the eNB 1602. The eNB 1602 receives the request and transmits an acknowledgement of the request S1612. The eNB 1602 receives the data and determines a route to transmit the data to the hot spot 1606. The eNB then transmits that data S1614 to the vehicle 1604. The vehicle 1604 travels toward the hot spot 1606 and transmits the data S1616 when it determines it is near the hot spot 1606 based on instructions received from the eNB 1602.

The methods described above deliver data to an end point without relying on any feedback from the end point. Thus, in an embodiment, data may be delivered to the end point even when having any form of end-to-end configuration is not possible. This may require each packet that is transmitted to be fully self-contained.

Figure 17:
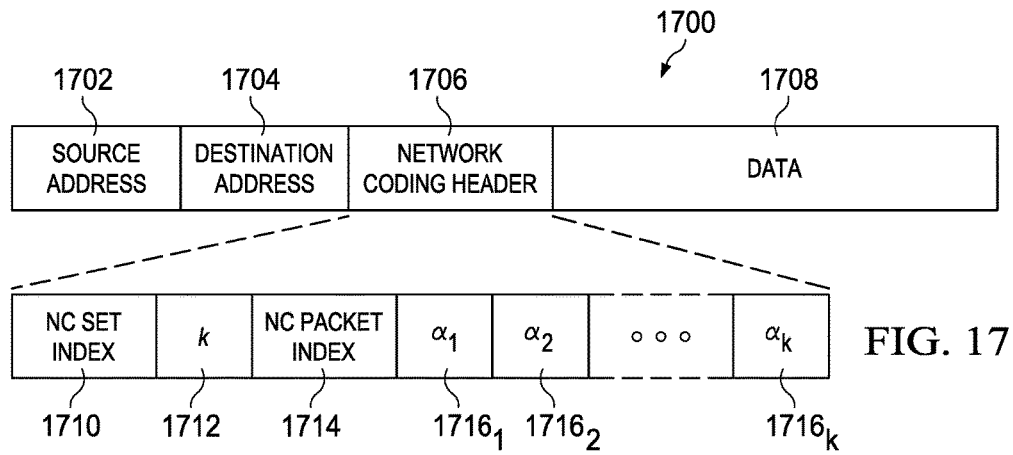
FIG. 17 is a diagram of an embodiment of a portion of a header.

FIG. 17 is a diagram of an embodiment of a format for packets 1700. Packet 1700 can represent part of a MAC header. Packet 1700 includes a source address field 1702, a destination address field 1704, a network coding header field 1706, and a data field 1708. The network coding header 1706 includes a network coding (NC) set index field 1710, a network code length field 1712, an NC packet index field 1714, and a plurality of coefficient fields 1716$_i$, i=1, . . . , k.

FIG. 17 illustrates an example format for the packets 1700 sent from the access point to the vehicles. The source and destination address are identifiers of the source device and the destination device, respectively. The network coding header consists of:

The network coding (NC) set index 1710: this is the index of the set of packets over which network coding is performed k: is the network code length 1712, i.e., the number of packets in the network coding set NC packet index field 1714 provides the index of the network coded packet transmitted for the present network coding set (i.e., first network coded packet for the set has index 1, second network coded packet set has index 2, and so on). Another approach is to have a fixed length counter. For a 1-bit counter (toggle), a change in value indicates a new network packet set. A n-bit counter can also be used. Another technique is to use a start bit, a stop bit, and an n-bit counter. The start bit can indicate the start of the set while the stop bit can indicate the end of the set. The counter can indicate sets for a period of time.

The coefficient fields 1716$_i$ provide the $\alpha_1, \alpha_2, \ldots, \alpha_k$, which are the coefficients chosen for this packet.

Note that explicitly including $\alpha_1, \alpha_2, \ldots, \alpha_k$ in the header can be avoided if a mapping from the NC packet index to coefficient vectors can be preconfigured.

Figure 18:
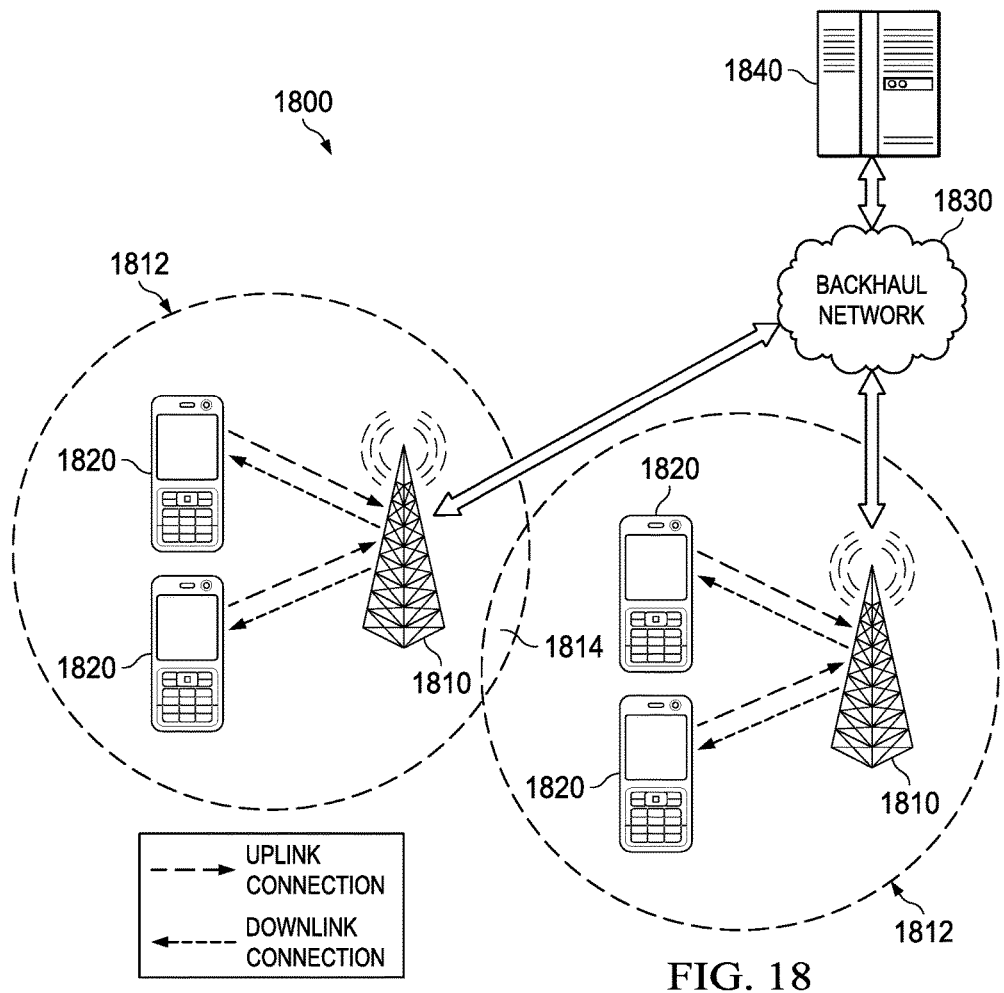
FIG. 18 illustrates a network for communicating data.

FIG. 18 illustrates a network 1800 for communicating data. The network 1800 comprises a plurality of access points (APs) 1810 each having a coverage area 1812, a plurality of user equipment (UEs) 1820, a backhaul network 1830, and a media server 1840. As used herein, the term AP may also be referred to as a transmission point (TP), a base station (BS), a base transceiver station (BTS), or an eNB, and the terms may be used interchangeably throughout this disclosure. These coverage areas represent the range of each AP 1810 to adequately transmit data, and the coverage areas of adjacent APs 1810 may have some overlap 1814 in order to accommodate handoffs between APs 1810 whenever a UE 1820 exits one coverage area 1812 and enters an adjacent coverage area 1812. The AP 1810 may comprise any component capable of providing wireless access by, inter alia, establishing uplink (dashed line) and/or downlink (dotted line) connections with the UEs 1820, such as a base transceiver station (BTS), an enhanced base station (eNB), a femtocell, and other wirelessly enabled devices. The UEs 1820 may comprise any component capable of establishing a wireless connection with the AP 1810. For example, the UE 1820 may be a smartphone, a laptop computer, a tablet computer, a wireless telephone, etc. The UEs 1820 may also be referred to as wireless devices, mobile devices, or wireless mobile devices. The backhaul network 1830 may be any component or collection of components that allow data to be exchanged between the AP 1810 and a remote end (not shown). In some embodiments, the network 1800 may comprise various other wireless devices, such as relays, femtocells, etc.

The media server APs 1810 and UEs 1820 may provide auxiliary content delivery to other UEs 1820 or devices (not shown) according the systems and methods described herein. Network 1800 is merely an example of a network in which the disclosed methods and systems may be implemented.

Figure 19:
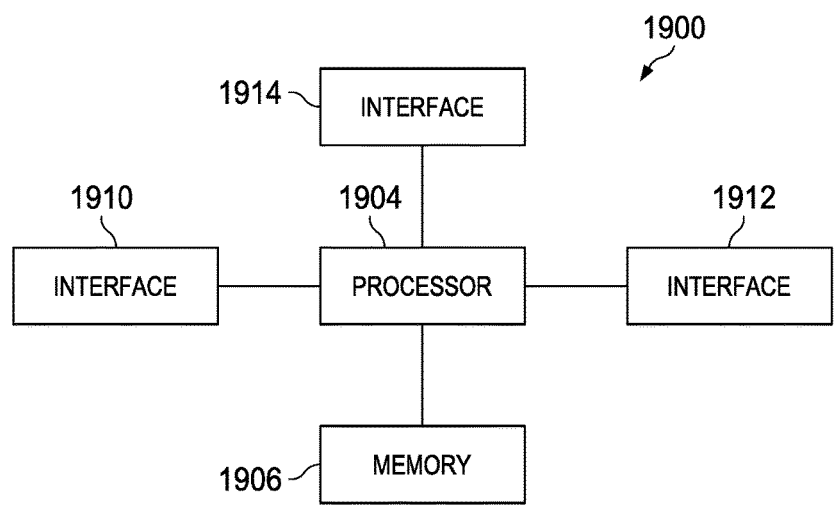
FIG. 19 illustrates a block diagram of an embodiment processing system for performing methods described herein, which may be installed in a host device.

FIG. 19 illustrates a block diagram of an embodiment processing system 1900 for performing methods described herein, which may be installed in a host device. As shown, the processing system 1900 includes a processor 1904, a memory 1906, and interfaces 1910-1914, which may (or may not) be arranged as shown in the figure. The processor 1904 may be any component or collection of components adapted to perform computations and/or other processing related tasks, and the memory 1906 may be any component or collection of components adapted to store programming and/or instructions for execution by the processor 1904. In an embodiment, the memory 1906 includes a non-transitory computer readable medium. The interfaces 1910, 1912, 1914 may be any component or collection of components that allow the processing system 1900 to communicate with other devices/components and/or a user. For example, one or more of the interfaces 1910, 1912, 1914 may be adapted to communicate data, control, or management messages from the processor 1904 to applications installed on the host device and/or a remote device. As another example, one or more of the interfaces 1910, 1912, 1914 may be adapted to allow a user or user device (e.g., personal computer (PC), etc.) to interact/communicate with the processing system 1900. The processing system 1900 may include additional components not depicted in the figure, such as long term storage (e.g., non-volatile memory, etc.).

In some embodiments, the processing system 1900 is included in a device that is accessing, or part otherwise of, a telecommunications network. In one example, the processing system 1900 is in a network-side device in a wireless or wireline telecommunications network, such as a base station, a relay station, a scheduler, a controller, a gateway, a router, an applications server, or any other device in the telecommunications network. In other embodiments, the processing system 1900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1910, 1912, 1914 connects the processing system 1900 to a transceiver adapted to transmit and receive signaling over the telecommunications network.

Figure 20:
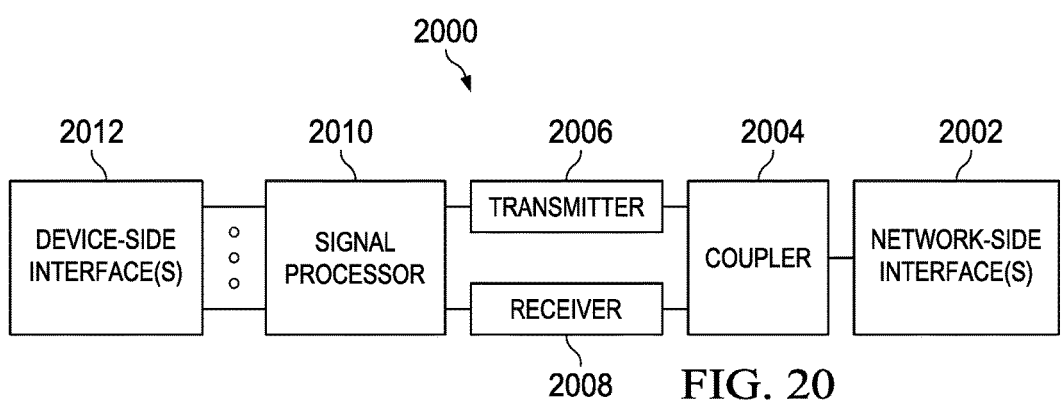
FIG. 20 illustrates a block diagram of a transceiver adapted to transmit and receive signaling over a telecommunications network.

FIG. 20 illustrates a block diagram of a transceiver 2000 adapted to transmit and receive signaling over a telecommunications network. The transceiver 2000 may be installed in a host device. As shown, the transceiver 2000 comprises a network-side interface 2002, a coupler 2004, a transmitter 2006, a receiver 2008, a signal processor 2010, and a device-side interface 2012. The network-side interface 2002 may include any component or collection of components adapted to transmit or receive signaling over a wireless or wireline telecommunications network. The coupler 2004 may include any component or collection of components adapted to facilitate bi-directional communication over the network-side interface 2002. The transmitter 2006 may include any component or collection of components (e.g., up-converter, power amplifier, etc.) adapted to convert a baseband signal into a modulated carrier signal suitable for transmission over the network-side interface 2002. The receiver 2008 may include any component or collection of components (e.g., down-converter, low noise amplifier, etc.) adapted to convert a carrier signal received over the network-side interface 2002 into a baseband signal. The signal processor 2010 may include any component or collection of components adapted to convert a baseband signal into a data signal suitable for communication over the device-side interface(s) 2012, or vice-versa. The device-side interface(s) 2012 may include any component or collection of components adapted to communicate data-signals between the signal processor 2010 and components within the host device (e.g., the processing system 1900, local area network (LAN) ports, etc.).

The transceiver 2000 may transmit and receive signaling over any type of communications medium. In some embodiments, the transceiver 2000 transmits and receives signaling over a wireless medium. For example, the transceiver 2000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2002 comprises one or more antenna/radiating elements. For example, the network-side interface 2002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

In an embodiment, a method in a transmission point (TP) for auxiliary content delivery includes determining a mobile wireless device capable of auxiliary content delivery to an end device. The method also includes encoding content data into a plurality of content data packets such that the content data is recoverable by the end device from less than all of the plurality of content data packets. The method also includes determining control data, the control data providing the mobile wireless device with instructions for retransmitting the one or more plurality of content data packets to the end device. The method also includes transmitting control data and one or more of the plurality of content data packets to the mobile wireless device when the mobile wireless device is within a high speed coverage area of the TP. The control data instructs the mobile wireless device when to retransmit the one or more of the plurality of content data packets to the end device. The control data also provides the mobile wireless device with instructions as to what resources to use to retransmit the one or more of the plurality of content data packets to the end device.

In an embodiment, a transmission point (TP) for auxiliary content delivery includes a non-transitory memory storage comprising instructions and one or more processors in communication with the memory. The one or more processors execute the instructions for determining a mobile wireless device capable of auxiliary content delivery to an end device. The one or more processors also execute the instructions for encoding content data into a plurality of content data packets such that the content data is recoverable by the end device from less than all of the plurality of content data packets. The one or more processor also execute the instructions for transmitting control data and one or more of the plurality of content data packets to the mobile wireless device when the mobile wireless device is within a high speed coverage area of the TP. The control data instructs the mobile wireless device when to retransmit the one or more of the plurality of content data packets to the end device. The control data also provides the mobile wireless device with instructions as to what resources to use to retransmit the one or more of the plurality of content data packets to the end device.

In an embodiment, a non-transitory computer-readable medium storing computer instructions for auxiliary content delivery, that when executed by one or more processors, cause the one or more processors to perform several steps. The steps include determining a mobile wireless device capable of auxiliary content delivery to an end device. The steps also include encoding content data into a plurality of content data packets such that the content data is recoverable by the end device from less than all of the plurality of content data packets. The steps also include transmitting control data and one or more of the plurality of content data packets to the mobile wireless device when the mobile wireless device is within a high speed coverage area of the TP. The control data instructs the mobile wireless device when to retransmit the one or more of the plurality of content data packets to the end device. The control data also provides the mobile wireless device with instructions as to what resources to use to retransmit the one or more of the plurality of content data packets to the end device.

In various embodiments, the mobile wireless device includes a first wireless device, wherein the control data comprises first control data and includes several other steps. The steps include determining a second mobile wireless device capable of auxiliary content delivery to an end device. The steps also include transmitting, by the TP, second control data and one or more of the plurality of content data packets to the second mobile wireless device when the second mobile wireless device is within a third proximity of the TP. The second control data provides second scheduling information to the second mobile wireless device for the retransmission of the one or more of the plurality of content data packets to the end device. The second scheduling information includes time and frequency resources for retransmission by the second mobile wireless device of the one or more of the plurality of content data packets to the end device when the mobile wireless device is within a fourth proximity of the end device.

In various embodiments, the control data instructs the mobile wireless device to autonomously determine when to retransmit the one or more of the plurality of content data packets to the end device. In various embodiments, determining a mobile wireless device capable of auxiliary content delivery to an end device includes determining the mobile wireless device according to geo-location data and velocity data for the mobile wireless device. In various embodiments, the control data is determined according to geo-location data and velocity data received from the mobile wireless device. In various embodiments, the end device is located near an edge of a coverage area of the TP or outside the coverage area of the TP. In various embodiments, the control data instructs the mobile wireless device to retransmit the one or more of the plurality of content data packets when the mobile wireless device detects a beacon from the end device. In various embodiments, the control data instructs the mobile wireless device to retransmit the one or more of the plurality of content data packets at a specified time, the specified time determined according to an estimate of when the mobile wireless device will be near the end device. In various embodiments, the control data instructs the mobile wireless device to retransmit the one or more of the plurality of content data packets according to when the mobile wireless device is in a TP specified geo-location.

In an embodiment, a method in a transmission point (TP) for auxiliary content delivery, includes determining, by the TP, a mobile wireless device capable of auxiliary content delivery to an end device; determining, by the TP, a first time when the mobile wireless device will be located in a first area such that the mobile wireless device is capable of receiving transmissions from the TP; determining, by the TP, a second time when the mobile wireless device will be located in a second area such that the mobile wireless device is capable of transmitting content data to the end device; and transmitting, by the TP, control data and content data to the mobile wireless device at the first time, wherein the control data instructs the mobile wireless device to transmit the content data to the end device at the second time or when the mobile wireless device autonomously determines that the end device is sufficiently proximate to the mobile wireless device to receive content data from the mobile wireless device. In an embodiment, the content data comprises coded content. In an embodiment, the coded data is determined according to a plurality of content data packets. In an embodiment, the mobile wireless device comprises a first wireless device, wherein the control data comprises first control data, wherein the content data comprises first content data, and further including determining, by the TP, a second mobile wireless device capable of auxiliary content delivery to an end device; determining, by the TP, a third time when the second mobile wireless device will be located in a third area such that the second mobile wireless device is capable of receiving transmissions from the TP; determining, by the TP, a fourth time when the second mobile wireless device will be located in the second area such that the mobile wireless device is capable of transmitting content data to the end device; and transmitting, by the TP, second control data and second content data to the second mobile wireless device at the third time, wherein the control data instructs the mobile wireless device to transmit the second content data to the end device at the second time or at the second location. In an embodiment, determining, by the TP, a mobile wireless device capable of auxiliary content delivery to an end device comprises determining the mobile wireless device according to geo-location data and velocity data for the mobile wireless device. In an embodiment, the geo-location data and velocity data are received from the mobile wireless device. In an embodiment, the end device is located near an edge of a coverage area of the TP or outside the coverage area of the TP.

In an embodiment, a transmission point (TP) for auxiliary content delivery, includes a non-transitory memory storage comprising instructions; and one or more processors in communication with the memory, wherein the one or more processors execute the instructions for: determining a mobile wireless device capable of auxiliary content delivery to an end device; determining a first time when the mobile wireless device will be located in a first area such that the mobile wireless device is capable of receiving transmissions from the TP; determining a second time when the mobile wireless device will be located in a second area such that the mobile wireless device is capable of transmitting content data to the end device; and transmitting control data and content data to the mobile wireless device at the first time, wherein the control data instructs the mobile wireless device to transmit the content data to the end device at the second time or when the mobile wireless device autonomously determines that the end device is sufficiently proximate to the mobile wireless device to receive data from the mobile wireless device.

In an embodiment, a non-transitory computer-readable medium storing computer instructions for auxiliary content delivery, that when executed by one or more processors, cause the one or more processors to perform the steps of: determining a mobile wireless device capable of auxiliary content delivery to an end device; determining a first time when the mobile wireless device will be located in a first area such that the mobile wireless device is capable of receiving transmissions from the TP; determining a second time when the mobile wireless device will be located in a second area such that the mobile wireless device is capable of transmitting content data to the end device; and transmitting control data and content data to the mobile wireless device at the first time, wherein the control data instructs the mobile wireless device to transmit the content data to the end device at the second time or when the mobile wireless device autonomously determines that the end device is sufficiently proximate to the mobile wireless device to receive data from the mobile wireless device.

In an embodiment, a method in a mobile wireless device for auxiliary content delivery, includes receiving content data from a transmission point (TP) at a first location; and transmitting the content data to a destination device when the mobile device has traveled to a second location. In an embodiment, transmitting the content data to the destination device comprises transmitting the content data to the destination device on resources specified by the TP. In an embodiment, transmitting the content data to the destination device comprises transmitting the content data to the destination device on resources determined autonomously by the mobile wireless device. In an embodiment, the second location is determined according to information provided by the TP. In an embodiment, the second location is determined autonomously by the mobile wireless device when the mobile wireless device detects the destination device. In an embodiment, the mobile wireless device is transported within, on, or attached to a vehicle. In an embodiment, the vehicle comprises one of an automobile, a train, a bus, a boat, an unmanned aerial vehicle (UAV), a helicopter, an airplane, a balloon, a bicycle, a cable car, or a ski lift. In an embodiment, the automobile comprises an autonomous self-driving automobile.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an encoding unit/module and a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method in a transmission point (TP) for auxiliary content delivery, comprising:
   determining, by the TP, a mobile wireless device capable of auxiliary content delivery to an end device according to predicted movement of the mobile wireless device with respect to the end device;
   encoding, by the TP, content data into a plurality of content data packets such that the content data is recoverable by the end device from a subset of the plurality of content data packets; and
   transmitting, by the TP, control data and one or more of the plurality of content data packets to the mobile wireless device in response to the mobile wireless device being within a first proximity of the TP, wherein the control data provides scheduling information to the mobile wireless device for retransmission of the one or more of the plurality of content data packets to the end device, and wherein the scheduling information comprises time and frequency resources for retransmission by the mobile wireless device of the one or more of the plurality of content data packets to the end device in response to the mobile wireless device being within a second proximity of the end device.

2. The method of claim 1, wherein the mobile wireless device comprises a first wireless device, wherein the control data comprises first control data, and further comprising:
   determining a second mobile wireless device capable of auxiliary content delivery to an end device; and
   transmitting second control data and one or more of the plurality of content data packets to the second mobile wireless device in response to the second mobile wireless device is within a third proximity of the TP, wherein the second control data provides second scheduling information to the second mobile wireless device for the retransmission of the one or more of the plurality of content data packets to the end device, and wherein the second scheduling information comprises time and frequency resources for retransmission by the second mobile wireless device of the one or more of the plurality of content data packets to the end device in response to the mobile wireless device being within a fourth proximity of the end device.

3. The method of claim 1, wherein determining a mobile wireless device capable of auxiliary content delivery to an end device comprises determining the mobile wireless device according to geo-location data and velocity data for the mobile wireless device.

4. The method of claim 3, wherein the control data is determined according to geo-location data and velocity data received from the mobile wireless device.

5. The method of claim 1, wherein the end device is located near an edge of a coverage area of the TP or outside the coverage area of the TP.

6. The method of claim 1, wherein the control data instructs the mobile wireless device to retransmit the one or more of the plurality of content data packets in response to the mobile wireless device detecting a beacon from the end device.

7. The method of claim 1, wherein the control data schedules the mobile wireless device to retransmit the one or more of the plurality of content data packets at a specified time, the specific time determined according to an estimated time of the mobile wireless device being near the end device or determined according to a proximity of a geo-location of the end device.

8. A transmission point (TP) for auxiliary content delivery, comprising:
   a non-transitory memory storage comprising instructions; and
   one or more processors in communication with the non-transitory memory storage, wherein the one or more processors execute the instructions for:

determining a mobile wireless device capable of auxiliary content delivery to an end device according to predicted movement of the mobile wireless device with respect to the end device;

encoding content data into a plurality of content data packets such that the content data is recoverable by the end device from a subset of the plurality of content data packets; and transmitting control data and one or more of the plurality of content data packets to the mobile wireless device in response to the mobile wireless device being within a first proximity of the TP, wherein the control data provides scheduling information to the mobile wireless device for retransmission of the one or more of the plurality of content data packets to the end device, and wherein the scheduling information comprises time and frequency resources for retransmission by the mobile wireless device of the one or more of the plurality of content data packets to the end device in response to the mobile wireless device being within a second proximity of the end device.

9. The TP of claim 8, wherein the mobile wireless device comprises a first wireless device, wherein the control data comprises first control data, and wherein the programming further includes instructions for:

determining a second mobile wireless device capable of auxiliary content delivery to an end device; and transmitting second control data and one or more of the plurality of content data packets to the second mobile wireless device in response to the second mobile wireless device being within a third proximity of the TP, wherein the second control data provides second scheduling information to the second mobile wireless device for the retransmission of the one or more of the plurality of content data packets to the end device, and wherein the second scheduling information comprises time and frequency resources for retransmission by the second mobile wireless device of the one or more of the plurality of content data packets to the end device in response to the mobile wireless device being within a fourth proximity of the end device.

10. The TP of claim 8, wherein the instructions for determining a mobile wireless device capable of auxiliary content delivery to an end device comprises determining the mobile wireless device according to geo-location data and velocity data for the mobile wireless device.

11. The TP of claim 10, wherein the control data is determined according to geo-location data and velocity data received from the mobile wireless device.

12. The TP of claim 8, wherein the end device is located near an edge of a coverage area of the TP or outside the coverage area of the TP.

13. The TP of claim 8, wherein the control data instructs the mobile wireless device to retransmit the one or more of the plurality of content data packets in response to the mobile wireless device detecting a beacon from the end device.

14. The TP of claim 8, wherein the control data schedules the mobile wireless device to retransmit the one or more of the plurality of content data packets at a specified time, the specific time determined according to an estimated time of the mobile wireless device being near the end device or determined according to a proximity of a geo-location of the end device.

15. A non-transitory computer-readable medium storing computer instructions for auxiliary content delivery, that when executed by one or more processors, cause the one or more processors to perform the steps of:

determining a mobile wireless device capable of auxiliary content delivery to an end device according to predicted movement of the mobile wireless device with respect to the end device;

encoding content data into a plurality of content data packets such that the content data is recoverable by the end device from a subset of the plurality of content data packets; and transmitting control data and one or more of the plurality of content data packets to the mobile wireless device in response to the mobile wireless device being within a first proximity of a transmission point (TP), wherein the control data provides scheduling information to the mobile wireless device for retransmission of the one or more of the plurality of content data packets to the end device, and wherein the scheduling information comprises time and frequency resources for retransmission by the mobile wireless device of the one or more of the plurality of content data packets to the end device in response to the mobile wireless device being within a second proximity of the end device.

16. The non-transitory computer-readable medium of claim 15, wherein the mobile wireless device comprises a first wireless device, wherein the control data comprises first control data, and wherein the computer instructions for auxiliary content delivery include instructions, that when executed by the one or more processors, cause the one or more processors to perform the steps of:

determining a second mobile wireless device capable of auxiliary content delivery to an end device; and transmitting second control data and one or more of the plurality of content data packets to the second mobile wireless device in response to the second mobile wireless device being within a third proximity of the TP, wherein the second control data provides second scheduling information to the second mobile wireless device for the retransmission of the one or more of the plurality of content data packets to the end device, and wherein the second scheduling information comprises time and frequency resources for retransmission by the second mobile wireless device of the one or more of the plurality of content data packets to the end device in response to the mobile wireless device being within a fourth proximity of the end device.

17. The non-transitory computer-readable medium of claim 15, wherein the computer instructions, that when executed by the one or more processors, cause the one or more processors to perform the step of determining a mobile wireless device capable of auxiliary content delivery to an end device comprise instructions, that when executed by the one or more processors, cause the one or more processors to perform the step of determining the mobile wireless device according to geo-location data and velocity data for the mobile wireless device.

18. The non-transitory computer-readable medium of claim 17, wherein the control data is determined according to geo-location data and velocity data received from the mobile wireless device.

19. The non-transitory computer-readable medium of claim 15, wherein the end device is located near an edge of a coverage area of the TP or outside the coverage area of the TP.

20. The non-transitory computer-readable medium of claim 15, wherein the control data schedules the mobile wireless device to retransmit the one or more of the plurality of content data packets at a specified time, the specific time determined according to an estimated time of the mobile wireless device being near the end device or determined according to a proximity of a geo-location of the end device.

21. The non-transitory computer-readable medium of claim 15, wherein the control data instructs the mobile wireless device to retransmit the one or more of the plurality of content data packets according to the mobile wireless device being in a TP specified geo-location.

\* \* \* \* \*